(12) United States Patent
Nicoara et al.

(10) Patent No.: US 8,750,188 B2
(45) Date of Patent: Jun. 10, 2014

(54) SYSTEM SUPPORT FOR ACCESSING AND SWITCHING AMONG MULTIPLE WIRELESS INTERFACES ON MOBILE DEVICES

(75) Inventors: Angela Nicoara, San Jose, CA (US); S. M. Shahriar Nirjon, Charlottesville, VA (US); Jatinder Pal Singh, Mountain View, CA (US)

(73) Assignee: Deutsche Telekom AG, Bonn (DE)

( * ) Notice: Subject to any disclaimer, the term of this patent is extended or adjusted under 35 U.S.C. 154(b) by 288 days.

(21) Appl. No.: 13/238,307

(22) Filed: Sep. 21, 2011

(65) Prior Publication Data

US 2012/0140651 A1 Jun. 7, 2012

Related U.S. Application Data

(60) Provisional application No. 61/418,460, filed on Dec. 1, 2010.

(51) Int. Cl.
*H04W 52/02* (2009.01)
*H04W 48/18* (2009.01)
*H04W 24/00* (2009.01)
*H04W 88/06* (2009.01)

(52) U.S. Cl.
CPC .............. *H04W 52/02* (2013.01); *H04W 24/00* (2013.01); *H04W 48/18* (2013.01); *H04W 88/06* (2013.01)
USPC ........... 370/311; 370/252; 370/328; 455/437; 455/438

(58) Field of Classification Search
CPC ..... H04W 48/18; H04W 88/06; H04W 52/02; H04W 24/00
USPC .......... 370/328–338, 252, 311; 455/436–438, 455/443, 444, 456

See application file for complete search history.

(56) References Cited

U.S. PATENT DOCUMENTS

| | | | |
|---|---|---|---|
| 8,385,921 B1* | 2/2013 | Shousterman et al. | 455/442 |
| 8,493,931 B1* | 7/2013 | Nix | 370/331 |
| 2010/0017861 A1* | 1/2010 | Krishnaswamy et al. | 726/7 |
| 2011/0116479 A1* | 5/2011 | Jarzra et al. | 370/332 |
| 2011/0189997 A1* | 8/2011 | Tiwari et al. | 455/443 |
| 2011/0217981 A1* | 9/2011 | Bachmann et al. | 455/436 |
| 2012/0127955 A1* | 5/2012 | Gandham et al. | 370/331 |
| 2012/0127974 A1* | 5/2012 | Doppler et al. | 370/338 |

OTHER PUBLICATIONS

Agilent 34410A Digital Multimeter. http://www.home.agilent.com/agilent/product.jspx?pn=34410A, retrieved Oct. 27, 2011.

(Continued)

*Primary Examiner* — Andrew Chriss
*Assistant Examiner* — Rasha Fayed
(74) *Attorney, Agent, or Firm* — Leydig, Voit & Mayer, Ltd.

(57) ABSTRACT

A client-based system for use in a mobile client device in communication with a remote server device provides for dynamically switching among multiple wireless interfaces on the mobile client device. The system includes a first interface for communicating over a cellular network, a second interface for communicating over a WiFi network, and a computer-readable medium within the mobile client device, having thereon computer-executable instructions for switching one or more connection-oriented sessions from one of the first and second interfaces to the other based on a selection policy selected from an energy saving selection policy, an offload selection policy, and a performance selection policy.

19 Claims, 23 Drawing Sheets

(56) References Cited

OTHER PUBLICATIONS

Android Developer Phone 2 (ADP2). http://developer.htc.com/google-io-device.html, retrieved Oct. 27, 2011.

Ahmad Rahmati, Lin Zhong. Context-for-Wireless: Context-Sensitive Energy Efficient Wireless Data Transfer. In Proc. of ACM 5th International Conference on Mobile Systems, Applications, and Services (MobiSys'07), San Juan, Puerto Rico, 2007, p. 165-178.

J. Apostolopoulos and M. Trott. Path diversity for enhanced media streaming, IEEE Communications Magazine, 42(8):80-87, Aug. 2004.

A. Balasubramanian, R. Mahajan, and A. Venkataramani. Augmenting mobile 3G using WiFi. In Proc. of ACM International Conference on Mobile Systems, Applications, and Services (MobiSys'10), pp. 209-222, San Francisco, CA, Mar. 2010.

R. Chalmers and K. Almeroth. A mobility gateway for small device networks. In Proc. of IEEE International Conference on Pervasive Computing and Communications (PerCom'04), pp. 209-218, Orlando, FL, Mar. 2004.

E. Gustafsson and A. Jonsson. Always best connected. IEEE Wireless Communications Magazine, 10(1):49-55, Feb. 2003.

S. Kandula, K. Lin, T. Badirkhanli, and D. Katabi. FatVAP: Aggregating AP backhaul capacity to maximize throughput. In Proc. of USENIX Symposium on Networked Systems Design and Implementation (NSDI'08), pp. 89-104, San Francisco, CA, Apr. 2008.

S. Kim and J. Copeland, TCP for seamless vertical handoff in hybrid mobile data networks, In Proc. of IEEE Global Telecommunications Conference (GLOBECOM'03), pp. 661-665, San Francisco, CA, Dec. 2003.

P. Nikander, J. Arkko, T. Aura, and G. Montenegro, Mobile IP version 6 (MIPv6) route optimization security design. In Proc. of IEEE Vehicular 31 Technology Conference (VTC'03—Fall), pp. 2004-2008, Orlando, FL, Oct. 2003.

Niranjan Balasubramanian, Aruna Balasubramanian, Arun Venkataramani. Energy Consumption in Mobile Phones: A Measurement Study and Implications for Network Applications. In Proc. of ACM SIGCOMM Internet Measurement Conference (IMC'09), Chicago, Illinois, USA, 2009, p. 1-14.

K. Pahlavan, P. Krishnamurthy, A. Hatami, M. Ylianttila, J. Makela, R. Pichna, and J. Vallstron. Handoff in hybrid mobile data networks, IEEE Personal Communications, 7(2):34-47, Apr. 2000.

C. Perkins. Mobile IP. IEEE Wireless Communications Magazine, 35(5):84-99, May 1997.

A. Rahmati, C. Shepard, Angela Nicoara, L. Zhong, and J. Singh. Mobile TCP usage characteristics and the feasibility of network migration without infrastructure support. In Proc. of ACM 16th International Conference on Mobile Computing and Networking (MobiCom'10),Chicago, Illinois, USA, Chicago, IL, Sep. 2010, p. 1-3. Poster Session.

A. Sgora and D. Vergados. Handoff prioritization and decision schemes in wireless cellular networks: a survey. IEEE Communications Surveys & Tutorials, 11(4):57-77. Fourth Quarter 2009.

P. Sharma, S. Lee, J. Brassil, and K. Shin. Handheld routers: Intelligent bandwidth aggregation for mobile collaborative communities. In Proc. of International Conference on Broadband Networks (BroadNets'04), pp. 537-547, San Jose, CA, Oct. 2004.

N. Thompson, G. He, and H. Luo, Flow scheduling for end-host multihoming. In Proc. of IEEE International Conference on Computer Communications (INFOCOM'06), pp. 1-12, Barcelona, Spain, Apr. 2006.

B. Wang, W. Wei, J. Kurose, D. Towsley, K. Pattipati, Z. Guo, and Z. Peng. Application-layer multipath data transfer via TCP: Schemes and performance tradeoffs. Elsevier Performance Evaluation, 64(9-12):965-977, Oct. 2007.

Y. Wang, S. Wenger, J. Wen, and A. Katsaggelos. Error resilient video coding techniques. IEEE Signal Processing Magazine, 17(4):61-82, Jul. 2000.

Web Page of Video Traces Research Group, 2010. http://trace.eas.asu.edu/tracemain.html., retrieved Oct. 27, 2011.

X. Wu, M. Chan, and A. Ananda. TCP handoff: a practical TCP enhancement for heterogeneous mobile environments. In Proc. of IEEE International Conference on Communications (ICC'07), pp. 6043-6048, Glasgow, UK, Jun. 2007.

Cisco visual networking index: Forecast and Methodology, 2010-2015, http://www.cisco.com/en/US/solutions/collateral/ns525/ns537/ns705/ns827/white_paper_c11-481360.pdf, retrieved Oct. 27, 2011.

\* cited by examiner

```
1  SwitchingManager mgr = new SwitchingManager(getSystemService("SM"));
2  Boolean r = false;
3  try f
4      r = mgr.switchToInterface(mgr.MOBILE);
5      if (r == true) {
6              // success in switching over 3G
7              // new sessions start over 3G now
8      }
9  } catch(SwitchingException ex) {
10          ex.printStackTrace();
11 }
```

```
1  SwitchingManager mgr = new
SwitchingManager(getSystemService("SM"));
2  String ip = "12.71.54.184";
3  int port1 = 5050, port2 = 5051;
4  InetAddress a = InetAddress.getByName(ip);
5  try {
6      if (mgr.useInterface(a, mgr.MOBILE)) {
7          Socket ms = new Socket(ip, port1);
8          // transfer sensitive data over secured 3G
9      }
10     if (mgr.useInterface(a, mgr.WIFI)) {
11         Socket ws = new Socket(ip, port2);
12         // transfer less sensitive data over public WiFi
13     }
14 } catch(SwitchingException ex) {
15     ex.printStackTrace();
16 }
```

*FIG. 9*

SYSTEM SUPPORT FOR ACCESSING AND SWITCHING AMONG MULTIPLE WIRELESS INTERFACES ON MOBILE DEVICES

CROSS REFERENCED TO RELATED APPLICATIONS

This application claims the benefit of U.S. Provisional Application No. 61/418,460, filed Dec. 1, 2010, which is incorporated by reference in its entirety for all that it teaches

FIELD

This description relates generally to the field of mobile networking devices, and, more particularly, to system support for utilizing multiple network interfaces on a single mobile device.

BACKGROUND

Recent market forecasts predict that mobile data traffic will increase 39 times between 2009 and 2014, while 66% of traffic will be mobile video traffic. Mobile computing devices are continually growing and increasing in processing power; however, energy efficiency and battery life remain very important limitations of smartphones and other mobile handheld computing devices (hereinafter collectively referred to as "smartphones"). Compounding this issue, wireless data transfer consumes significant energy.

A smartphone may have multiple network interfaces, i.e., both a cellular (3G/2G) and WiFi interface. WiFi networks are very efficient in data transmission due to their high bandwidth, and are also energy efficient when the phone is sending or receiving data. However, the radio interface of WiFi consumes significant energy even when the device is not sending or receiving any data.

3G or any cellular network interfaces in general, on the other hand, have very low idle-time energy consumption. However, unlike WiFi, 3G network interfaces are typically not energy-efficient during actual data communication. Their bandwidth is also 20 times lower than that of WiFi.

Dynamically distributing network traffic over multiple access networks from/to a smartphone by selecting the most suitable access network or by concurrently utilizing all access networks may be possible via one of a (i) master/slave approach, (ii) new protocols, and (iii) gateways. In a master/slave approach, an always-connected access network could be chosen as the master network, and other access networks are used as slave networks for opportunistic routing. However, such a solution would require essentially complete control over multiple access networks, which is rarely possible.

While new protocols in various layers may be advanced to support switching among access networks, an effective solution of this type has yet to be proposed. Gateways between smartphones and the Internet could perhaps also be used for distributing network traffic among multiple access networks. However, by definition, such a solution would require deploying expensive gateways, would incur additional network latency, and would require users to configure proxy settings in applications. The inventors have demonstrated the feasibility of TCP flow migration on iPhones, but without addressing or rigorously quantifying the policies and different benefits of switching interfaces. For example, please see *Seamless Flow Migration on Smartphones without Network Support—Technical Report* 2010-1214, Rice University, December 2010 (Ahmad Rahmati, Clayton Shepard, Angela Nicoara, Lin Zhong, Jatinder Singh) as well as U.S. Patent Application No. 61/383,847, filed on Sep. 17, 2010, Heterogeneous Network Access on Devices with One or Multiple Network Interfaces—, in the United States of America, to Angela Nicoara, Ahmad Rahmati, Clayton Shepard, Lin Zhong, Jatinder Singh It will be appreciated that the invention as protected is defined by the attached claims, regardless of whether the invention as claimed solves one or more of the noted deficiencies. Moreover, it is expressly noted, and should be fully appreciated by the reader, that the foregoing is not intended to be a survey or description of the prior art. Rather, it is a statement of background ideas set forth by the inventors intended to help the reader understand the following detailed description. As such, this background section provides just that—background information, not prior art information.

SUMMARY

In an embodiment, a client-based system is provided for use in a mobile client device in communication with a remote server device for dynamically switching among multiple wireless interfaces on the mobile client device. The system includes a first interface for communicating over a cellular network, a second interface for communicating over a WiFi network, and a computer-readable medium within the mobile client device, having thereon computer-executable instructions for switching one or more connection-oriented sessions from one of the first and second interfaces to the other based on a selection policy selected from an energy saving selection policy, an offload selection policy, and a performance selection policy.

In another embodiment, a method is provided to allow a mobile client device to dynamically switch among multiple wireless interfaces to respective multiple wireless networks. The method includes using a first one of the multiple wireless interfaces to execute one or more connection-oriented sessions, accessing a selection policy, determining while using the first one of the multiple wireless interfaces that switching to a second one of the multiple wireless interfaces is required to conform to the selection policy, and switching the one or more connection-oriented sessions from the first wireless interface to the second wireless interface.

In a further embodiment, a method for switching wireless connection-oriented sessions in a mobile wireless device from a current one of a cellular interface and a WiFi interface to the other of the cellular interface and the WiFi interface is provided. The method comprises counting existing TCP connections on the current interface and adding new routing table entries for the counted connections specifying the destination address, gateway and mask for the current interface if the count is non zero so that existing TCP flows remain in the current interface. The method further includes activating the other of the interfaces and adding routing table entries for the other interface including a default route, and removing a default route of the routing table of the current interface. The method further entails awaiting expiration of a predefined timeout period and deactivating the current interface so that the device uses solely the other interface.

BRIEF DESCRIPTION OF THE DRAWINGS

FIG. 9 is a pseudocode listing showing an example API of concurrently using 3G and WiFi networks;

DETAILED DESCRIPTION

Embodiments of the invention pertain to the field of network access on smartphones with multiple network interfaces and provide a system that is capable of dynamically switching between cellular and WiFi networks to achieve energy efficiency, data offloading, and high performance data communication. Certain embodiments provide operating system (OS) support for automatic switching of wireless interfaces in smartphones.

In overview, selection of network interface is dynamic in the described embodiments, based on the availability of the network, current state of the mobile phone and user preference. It does not require user intervention. Moreover, a client-based switching solution according to an embodiment of the invention does not require extra support from the existing network infrastructure. In addition, existing applications may run on top of the system without requiring any modifications.

Applications with the appropriate permissions (e.g., Wireless Settings application), can configure the switching engine using an API, and application programmers may specify the network interface to use for a specific communication. Programmers may also write programs so as to advantage of using multiple wireless interfaces simultaneously.

Although the inventors have implemented the system as an extension to the ANDROID OS, it will be appreciated that other systems may be used instead. In order to evaluate the system, the inventors collected data traces from 13 actual mobile phone users over three months. This confirmed that one can offload on average 79.82% of data traffic from cellular to WiFi network by automatically switching to WiFi whenever it is available. Moreover, energy measurements show that one can save on average 21.14 KJ of the energy per day per user or 27.4% of the total energy consumed by the phone for data activity by optimally switching between interfaces.

Figure 1A:
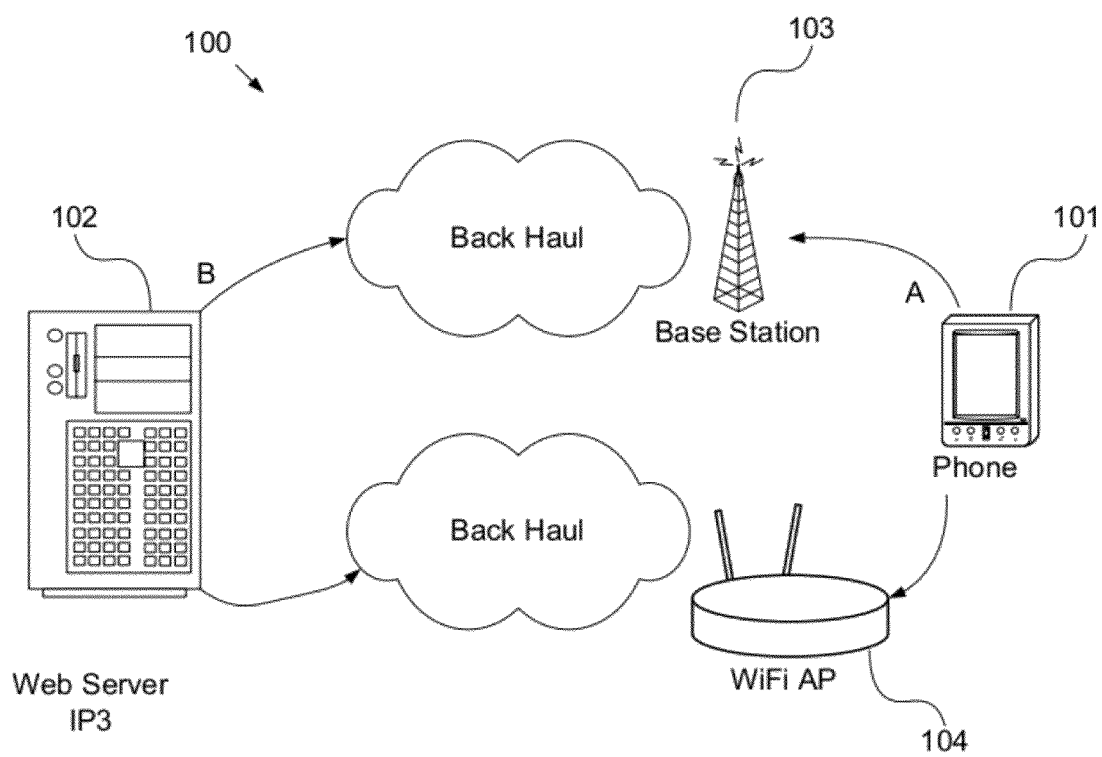
FIG. 1A is a network schematic diagram showing a mobile phone switching TCP flows from a 3G (IP1) to a WiFi (IP2) network.

Simply turning on one interface and turning off the other is not an effective solution for switching since it results in interruptions, partially loaded web pages, loss of data, error messages and user dissatisfaction in general. FIG. 1A illustrates the context of the switching task by way of an example scenario 100. An end host 101 (a mobile phone in the illustration) with two interfaces is communicating with a remote server 102 over the Internet, one over a cellular link 103 and the other through a WiFi AP 104. The server 102 and each of the two interfaces of the host have separate IP addresses.

The host establishes a TCP connection at its port A with the server's port B. When the connection is created, the operating system at both ends binds the ports to some interface. We assume that it is $IP_1$ at the host, $IP_3$ at the server, and the connection is characterized by the pair ($IP_1$/A, $IP_3$/B). After the communication has been started the host may decide to turn Off its interface having $IP_1$ and to continue the communication over $IP_2$. By manipulating the routing table, the host can actually send the next data packets over the new interface, but these packets will now carry the source IP of $IP_2$ and hence, even if they reach the server 102, the server is not aware that the packets belong to the same connection. From the standpoint of the server, $IP_1$ and $IP_2$ represent two different hosts.

Simply changing the packet headers of all outbound packets at the host so that they carry $IP_1$ as their source would create at least two problems: first, the packets may be dropped at $IP_2$'s network and second, the packets may get to the server, but the acknowledgements will not reach the host as the server will send ACK to $IP_1$ which is now closed and hence the communication will stop.

A client based solution for this problem can wait for all ongoing connections over the first interface to finish, before it turns Off the interface and activates the other one in order for not to cause any interruptions. Once the client decides to switch, however, this waiting time could theoretically be infinite. In practice, the delay depends on the usage of the phone and the characteristics of the applications that are running. To understand the type of data flows in mobile phones, the inventors conducted an experiment to collect the usage data from 13 Android phone users and study the characteristics of all TCP flows of all the applications.

The focus on flows is because almost all (99.7%) of the flows in mobile phones are TCP, and because TCP, which is connection-oriented, is harder to switch than other flow types.

The inventors have observed that the TCP connections in mobile phones are generally short-lived, have less concurrency, and the data activities are generally in bursts.

Figure 1B:
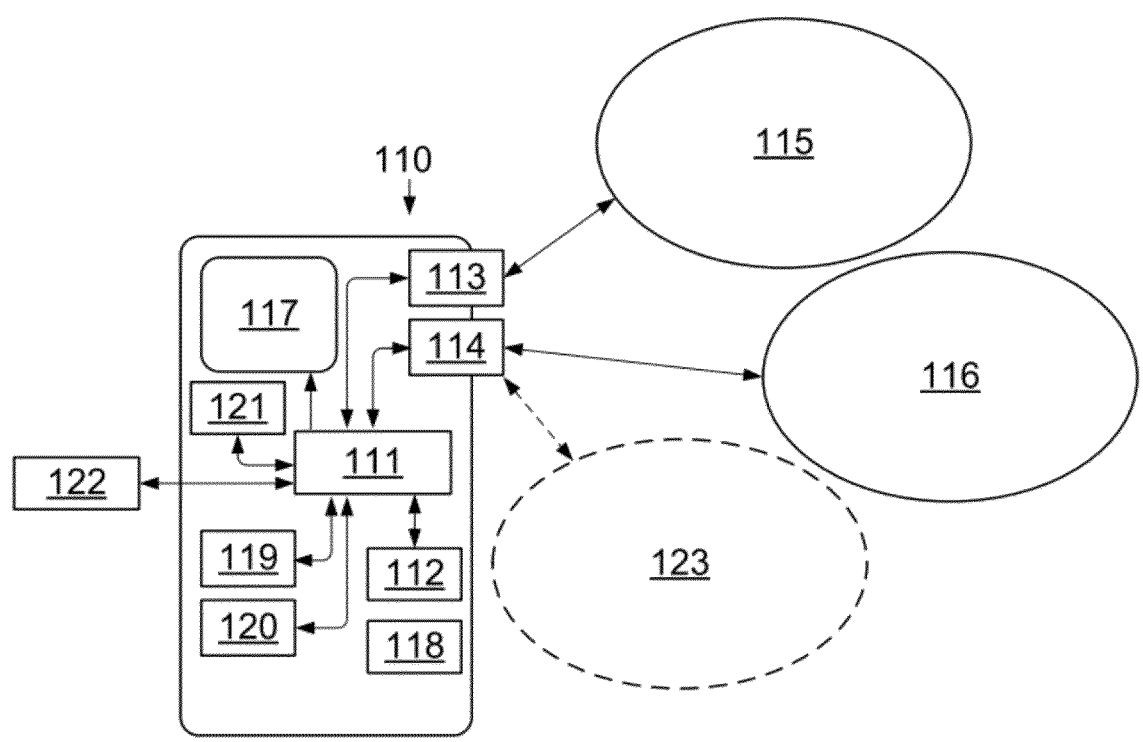
FIG. 1B is a device schematic showing a device and network environment within which various embodiments of the invention may be implemented.

Structurally, the smartphone 101 is a standard commercially available device, as noted above. Referring to FIG. 1B, which is a schematic illustration of a mobile device 100 and associated connectivity environment, the mobile device 110 includes a processor 111 and memory 112. The processor 111, also referred to as a computerized device or computer processor, is an integrated circuit device that is capable of reading and executing computer-readable instructions from a computer-readable medium, e.g., a tangible non-transient computer-readable medium such as a the electronic memory 112, a built-in or removable flash memory (element 112), a magnetic or optical disc memory, etc. The processor 111 interacts with other elements via electrical, usually digital, inputs and outputs, and thus may execute communications tasks, display tasks, audio tasks, calculations, and other actions that may be generally observed on a mobile device.

The memory 112 may also be used to store data for use in or resulting from processor calculations, as well more permanent data such as phone numbers, images, settings, and so on. The system and method described herein, insofar as they are executed at or implemented on the mobile device itself, are implemented by way of a program or code (computer-readable instructions) read from memory 112 by the processor 111 and executed by the processor 111.

The mobile device 100 also comprises a plurality of network interfaces 113-114. Each network interface 113, 114 is adapted to provided communication to or from the mobile device 110 via a respective wireless network 115, 116. As noted above, the respective networks are preferably distinct from one another in type, and may include, for example, a WiFi network and a cellular (e.g., 3G, 2G) network. In an embodiment wherein a single interface is used to connect to multiple networks, there may be only a single interface 114, and it may be adapted to access multiple networks simultaneously, e.g., networks 116 and 123.

The mobile device 110 may also include a visual user interface 117, e.g., a screen, and a tactile user interface 118, e.g., a keyboard or touch sensor. In an embodiment, the touch sensor may be part of the screen. The mobile device 110 may further include a microphone 119 and speaker 120 for facilitating communications, as well as an additional optional speaker 121 for emitting ring tones, alert sounds, and so on.

As will be described in greater detail hereinafter, the mobile device in an embodiment uses the multiple network interfaces 113, 114 to use different networks in parallel and to control and migrate data flows between the interfaces in a manner that increase performance and throughput while potentially also increasing energy efficiency.

Figure 2:
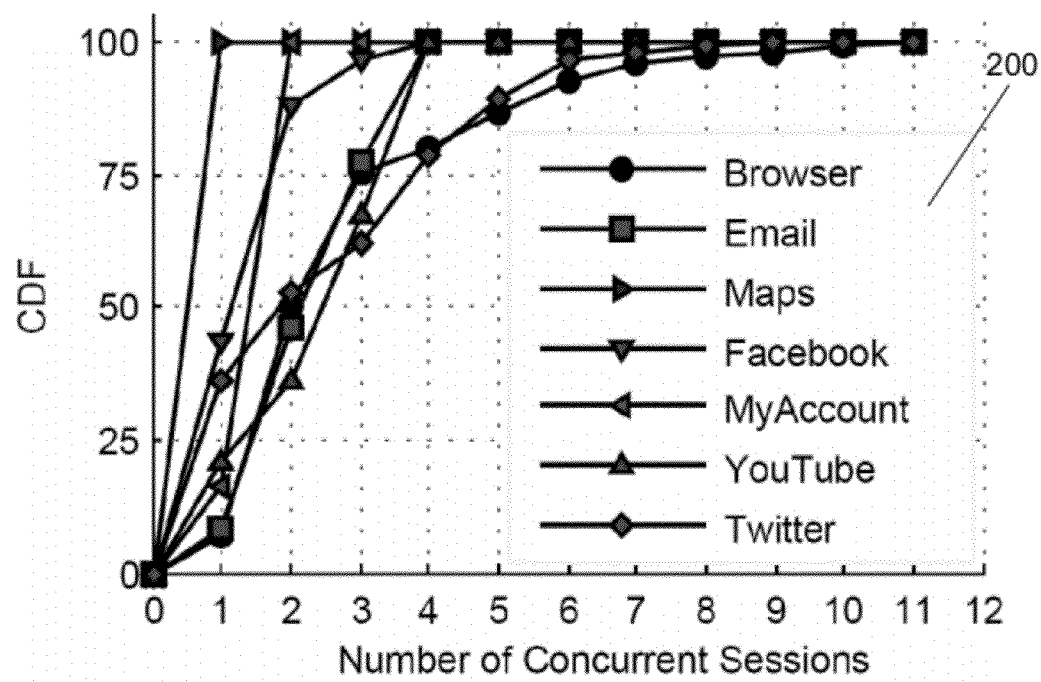
FIG. 2 is a data plot showing the CDF (cumulative distribution function) distribution of number of concurrent TCP sessions in an embodiment of the invention.
Figure 3:
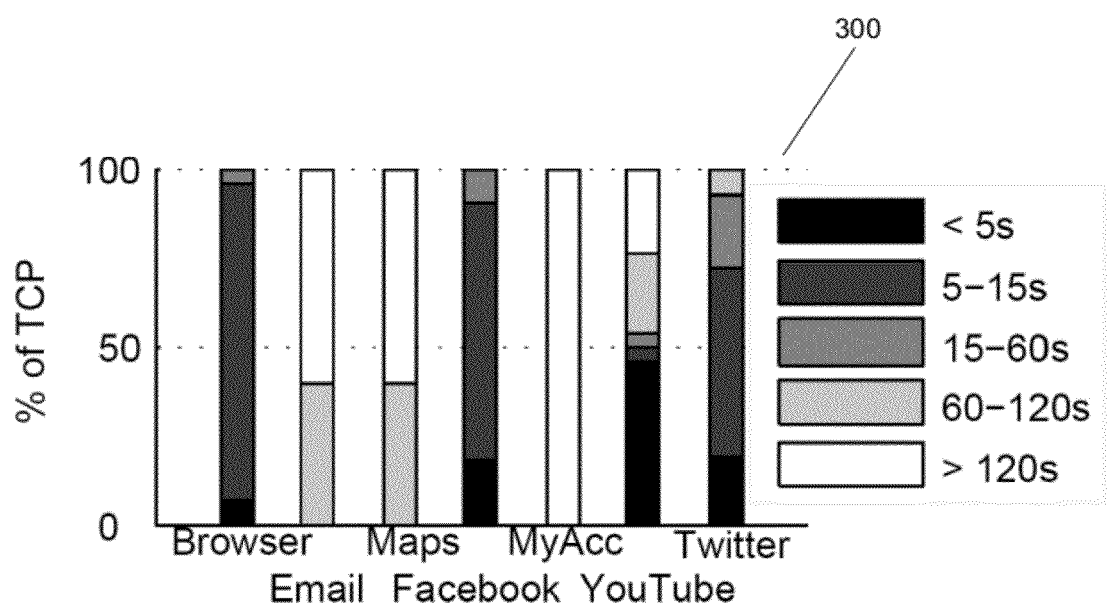
FIG. 3 is a bar chart showing shows the percentage of TCP sessions of various lengths.

The data plot 200 of FIG. 2 shows the cumulative distribution functions (CDF) of concurrent TCP sessions of 7 sample applications. The data is averaged over 10 min time windows for all users. The plot 300 of FIG. 3 classifies these sessions into 5 classes based on their respective durations. It can be seen that the concurrency of the TCP sessions is on average less than 2. Therefore, terminating a communication interface at any time may interrupt less than 2 sessions on average, assuming that only one application is active at a time. This would approximately hold for multi-tasking phones as well.

Applications like Browser and TWITTER seem to have high concurrency (of maximum 10-11), but approximately 80% of their sessions have lifetimes less than 15 sec. For these applications, we may on average have to wait for 15 sec before switching to the other interface. Applications like Email, Maps, and MY ACCOUNT have a high percentage of long lasting sessions (>120 sec). While this may appear to be a barrier to waiting for them to finish, the number of such long TCP sessions is very small (about 1). With these TCP sessions, the applications keep themselves connected to a specific server (e.g. in case of GOOGLE MAPS, it is 74.125.45.100) for the entire lifetime, resulting in the apparently long lifetimes.

Figure 4:
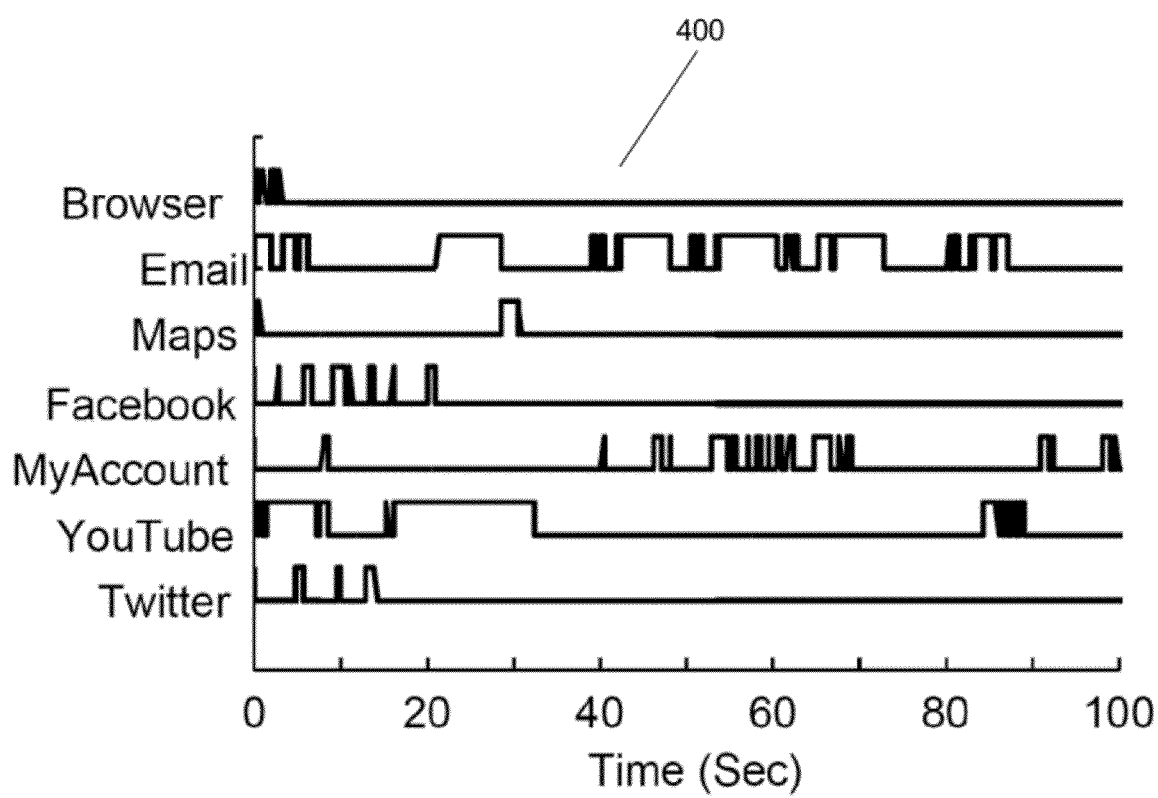
FIG. 4 is a timing plot showing the data activity of the longest TCP session for 100 seconds.

Examining the data activities in these long sessions, the plot 400 of FIG. 4 shows the presence of data activity of the longest lasting TCP sessions of each of these applications for a randomly selected user for the first 100 sec as an example. This shows that the data activities over these longest TCP sessions are not continuous, but rather are sporadic. Averaged over all usages, there is an average of 3 sec data activity between any two gaps over these sessions. Thus, we may wait on average about 3 sec for these applications before switching to a new interface to prevent any data loss.

Although this technique will cause that TCP session to terminate, mobile phone applications are written to accommodate sudden loss of network connectivity. Therefore, in such cases, when we switch to a new interface, the application considers it as a loss of connectivity and reestablishes the connection with the server. Based on the foregoing observations, the characteristics of TCP sessions in mobile phones can be summarized as follows:

1) Average lifetime of TCP sessions are ~2 sec.
2) Concurrency of these sessions are on average <2.
3) TCP activities are in bursts of average ~3 sec.
4) There exist long sessions that are alive during the entire lifetime of the application, which keep the application connected to its server. Disconnections of such sessions are automatically reestablished by the application.

The described system handles connectionless and connection-oriented sessions separately during the switching. UDP and TCP are the dominant transport protocols observed, for example, in ANDROID, and therefore may provide a suitable illustration. Connectionless sessions (e.g. UDP) in Android are rare, but are easier to switch. UDP applications communicate using DatagramSockets and each connection is bound to a port.

During the binding time, the OS assigns an IP address of any available wireless interface to that session. When packets are sent, each packet carries this IP/Port pair as the source. By bringing up the new interface and removing the default route of the old one, one can direct all next outbound packets to use the new interface. The described system uses this technique to switch all outbound flows, and once all the flows switch over to the new interface, it turns off the old interface. For incoming flows, this method initially incurs some packet loss, but in most cases this is handled by the application layer.

Figure 5A:
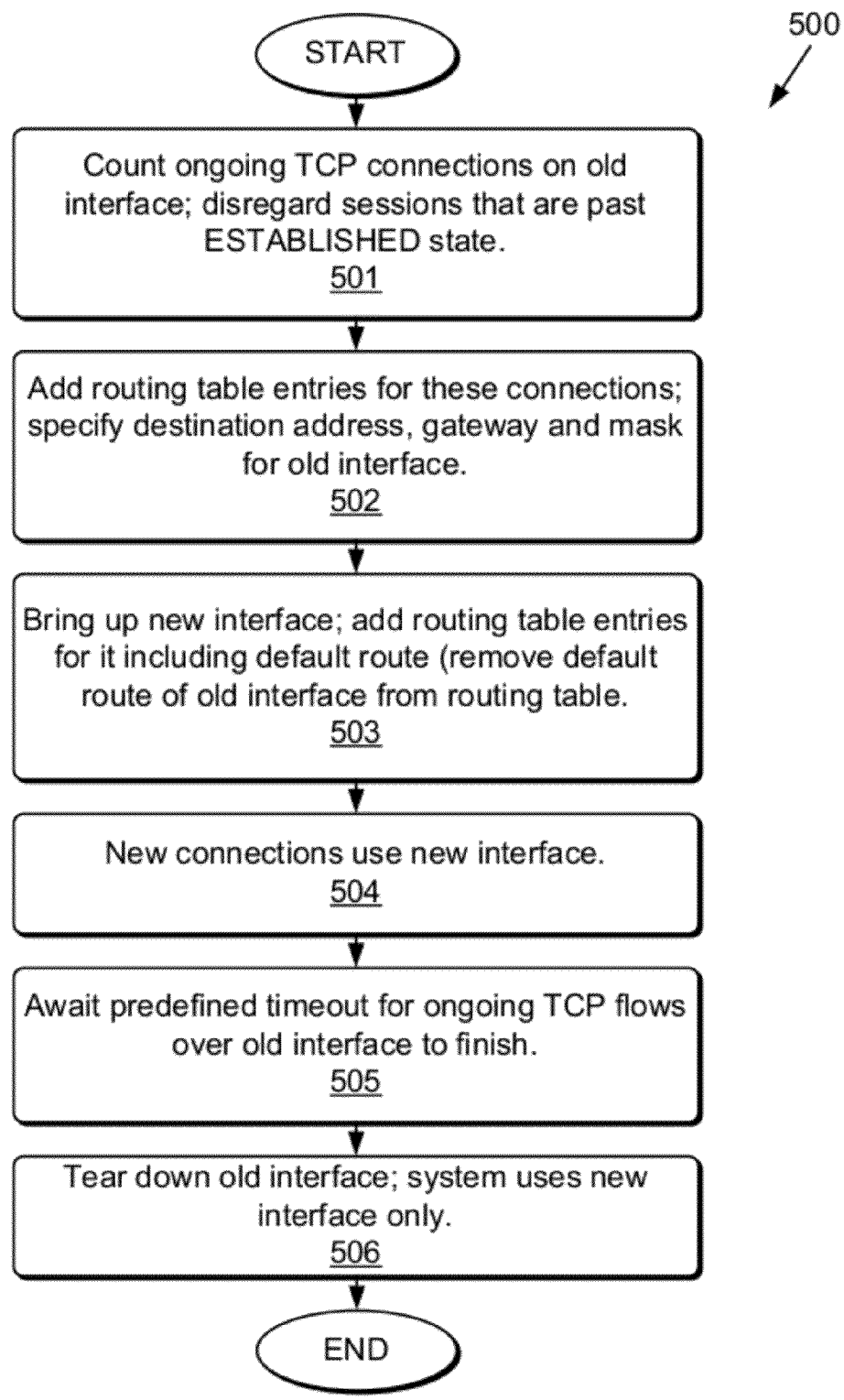
FIG. 5A is a flow chart illustrating a process of switching TCP sessions in accordance with an embodiment of the invention.

Connection-oriented sessions are predominantly TCP in ANDROID, with TCP sessions making up about 99.7% of connection-oriented sessions. As noted above, TCP sessions are more complicated to switch. In an embodiment, the described system performs the following steps for switching these flows, as illustrated in the process 500 of FIG. 5A:

Step 1: At stage 501, the system counts the number of ongoing TCP connections on the old interface. These connections, if any, should not be disrupted. Sessions that have gone past the ESTABLISHED state are disregarded at this stage.

Step 2: If the count is non zero, the system adds new routing table entries at stage 502 for all these connections explicitly specifying the destination address, gateway and mask for the old interface. This will ensure that the ongoing TCP flows remain in the same old interface.

Step 3: The system now brings up the new interface in stage 503 and adds routing table entries for it including the default route and removes the default route of the old interface from the routing table. As shown at stage 504, any new connections start using the new interface from this point on.

Step 4: At stage 505, the system waits for a predefined timeout in order for the ongoing TCP flows over the old interface to finish, and tears down the old interface completely at stage 506 and the system moves on to use solely the new interface.

Figure 5B:
FIG. 5B is a pseudocode listing showing the API used to switch to a new network wireless interface.

An exemplary system API 510 to switch to a new interface is shown in FIG. 5B. The method switchToInterface ( ) 511 takes the name of the interface as an argument and returns either success or failure. Upon failure, it throws an exception explaining the reason of failure.

Figure 6:
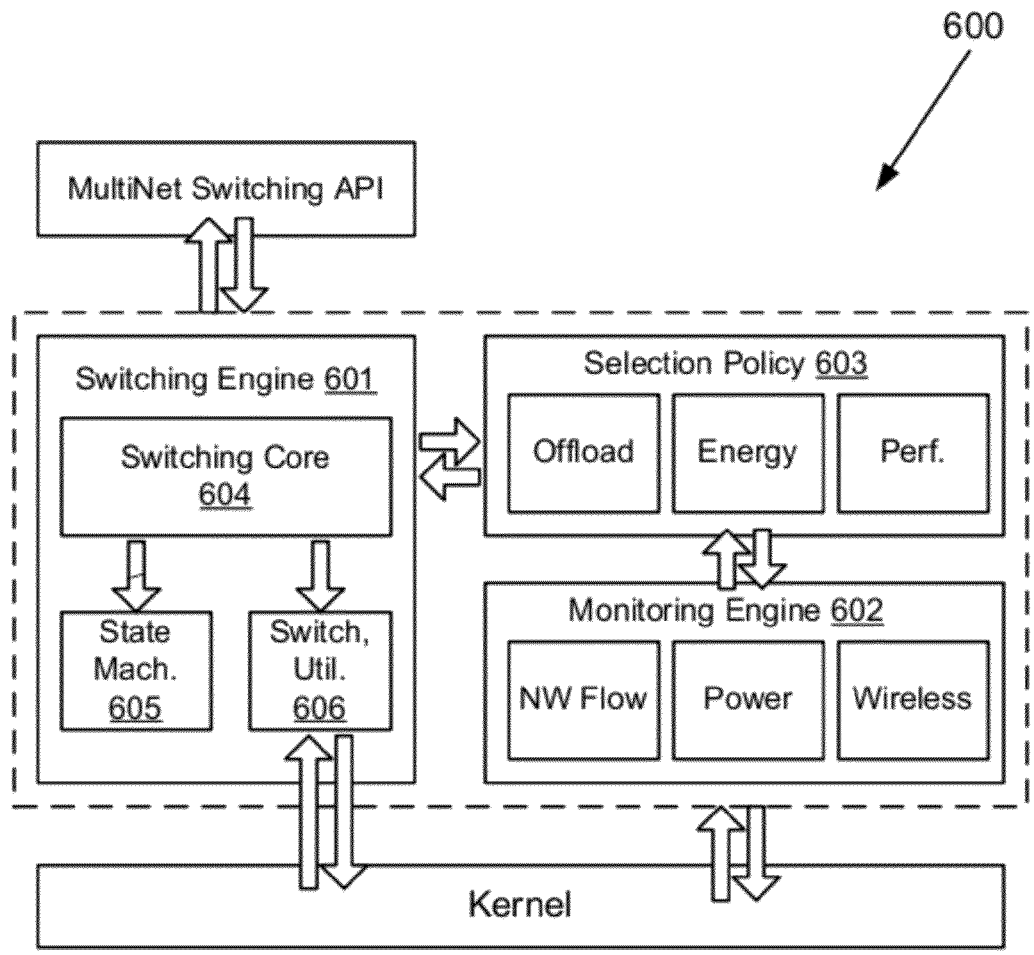
FIG. 6 is a schematic diagram showing the system architecture and interactions between its modules.

The design of the described system is modular, consisting of 3 principal components, namely the switching engine 601, monitoring engine 602, and selection policy 603, as shown in the system schematic 600 of FIG. 6. These components isolate the mechanism, policy and monitoring tasks of the system, and extend their capabilities without requiring any changes in the architecture.

The switching engine 601 performs the switching between the Cellular and the WiFi interfaces. It maintains an internal state machine 605 to keep track of the connectivity status. It also has a switching utility module 606 that performs the low level tasks related to switching. A core module 604 coordinates these two. The selection policy 603 is a module specifying the details of the selected policy, e.g., energy saving, offloading, or performance. The monitoring engine 602 monitors network flow, device power utilization, and wireless strength and availability.

Figure 7:
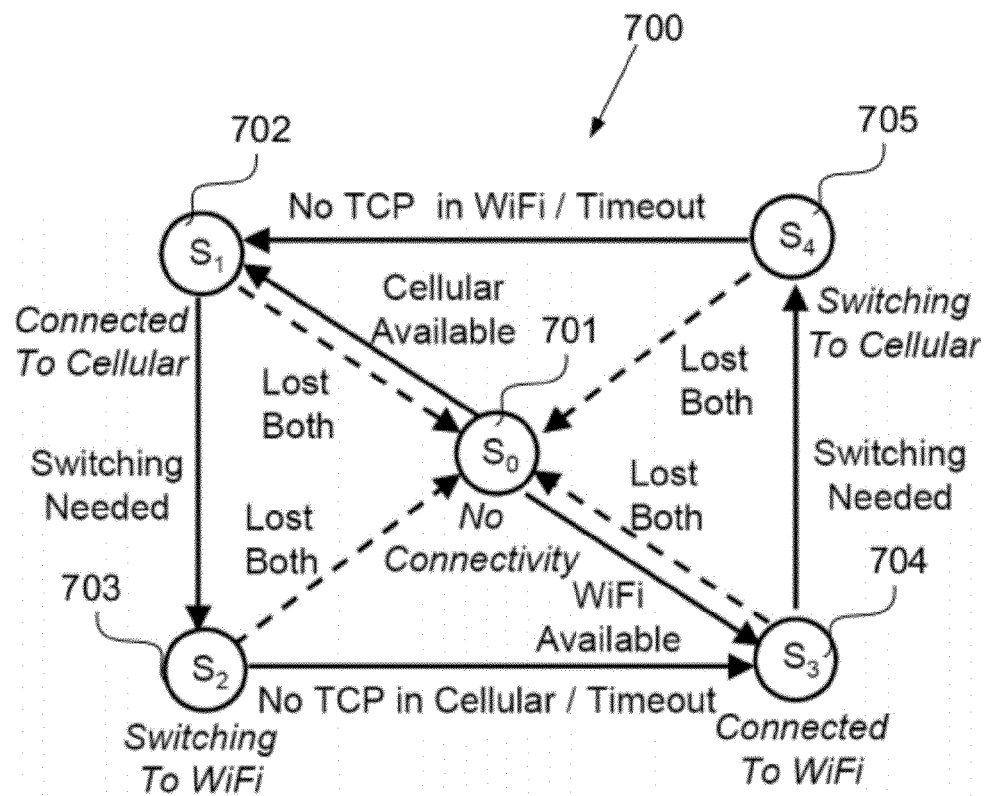
FIG. 7 is a simplified schematic showing the state machine together with all the states and transitions.

The state machine 605 of the switching engine 601, along with all states and transitions, is shown in greater detail in FIG. 7. The system remains at the NoConnectivity state ($S_0$) 701 when neither Cellular nor WiFi is available, and keeps seeking for a network to which to connect. The states ConnectedToCellular ($S_1$) 702 and ConnectedToWiFi ($S_3$) 703 are similar. At these states, the device uses only one wireless interface and periodically checks with the selection policy 603 to see if a switch is needed.

The states SwitchingToWiFi ($S_2$) 704 and SwitchingToCellular ($S_4$) 705 are the transition states. Both of the interfaces are active during these states, but only the new connections start over the new interface while existing flows remain in the previous interface. The engine 601 stays at these states as long as the old interface has active TCP sessions or until a timeout. Under normal circumstances, the system moves around within the states $\{S_1, S_2, S_3, S_4\}$ circularly. To cope with loss of connectivity at any time, the system 700 may make the transitions shown in dotted arrows to the central state 701.

The switching utility provides the utility methods to perform the switching. It includes the following tasks in an embodiment: counting the ongoing TCP flows over a specific network interface, updating the routing table to keep the existing TCP flows over a specific interface, adding and deleting default routes of the network interfaces, and connecting, reconnecting or tearing down interfaces. These methods may be called by the core switching module to perform a switch.

The monitoring engine is responsible for monitoring all the necessary phenomena pertaining to switching. It contains several different monitors, each of which observes one or more system variables, and holds the latest value of that variable. By way of example only, the system may contain 4 monitors—(i) Data Monitor: Monitors the amount of transmitted and received data over WiFi and Cellular interfaces in bytes and packets since the interface is turned On, (ii) Wireless Monitor: Monitors the connectivity status, signal strengths, and information of access points, (iii) Network Flow Monitor: Monitors the number and state of all TCP and UDP flows, routing information from the routing table, and (iv) Power Monitor: Monitors the state of the battery and its voltage, current, capacity, and temperature, and the LCD brightness.

These monitors are singleton and may be created on an on-demand basis. They have a common interface to answer all queries. The query and its response form a <key, value> pair. The Selection Policy component, to be described in greater detail below, issues these queries. The modular design of the monitors and the use of a common interface to communicate with them allow the user to add new monitors into the system and to extend the capability of the existing monitors easily.

The selection policy defines the policy for interface switching. In an embodiment, the policies are separated from the rest of the system so as to enable the addition of new policies or modification of existing policies without requiring any change to the other parts of the system. For example, a policy may based on the fact that WiFi is much faster than the Cellular network, but if this situation changes and Cellular data connectivity outperform WiFi, a change in current policy or addition of a new policy may be desired.

Three exemplary types of policies are an energy saving policy, and offload policy, and a performance policy. Each of these types of policy will be briefly discussed below.

The aim of an energy saving policy is to save energy. Since an optimum energy saving policy would theoretically benefit from quantization of future data traffic, one can use a switching heuristic which is driven by energy measurements. According to this policy, the device remains connected to the Cellular network during its idle time. When the user opens an application that starts sending and receiving mobile data, the device switches to WiFi (if available) as soon as the total amount of data over the Cellular network exceeds a threshold. The device switches back to Cellular only when there is no significant data activity over WiFi during the last minute.

With an Offload policy, the goal of the policy is to offload data traffic to any available WiFi network. According to this policy, whenever WiFi is available, the system will switch to WiFi. It will only switch back to the cellular network when WiFi becomes unavailable or its signal strength is below a predetermined threshold. The advantage of this policy is to reduce the demand on cellular networks. However, if the network is not being used, keeping the WiFi interface idle requires more energy than idling a cellular interface.

A performance policy has the goal of providing the user the best performance i.e. the highest throughput in data activity. According to this policy, the system will switch to whichever interface offers the best throughput. ANDROID phones allow applications to read the signal strengths of the cellular and available WiFi networks. From these signal strengths, the system infers the achievable bandwidth and switches to the interface with the higher bandwidth.

Figure 8:
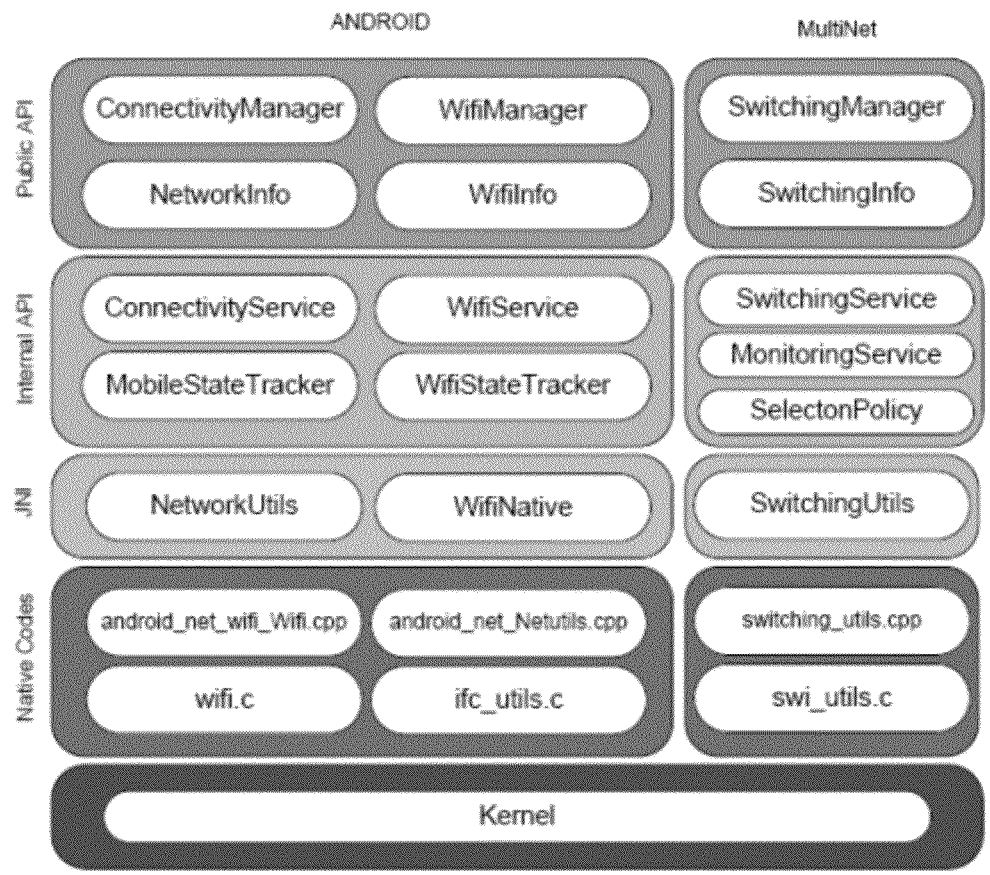
FIG. 8 is a simplified layer schematic showing the layered architecture of the system.

In a layered device OS environment, a layered system architecture may be used. For example, the ANDROID system is layered, and the experimental application described herein is therefore also layered. Classes and methods of the system that are similar to those of ANDROID are implemented at the same layer. However, the system is vertically distinguishable from ANDROID as is shown in the layer diagram 800 of FIG. 8. At the bottom of the architecture is the unmodified Linux Kernel 801. Immediately above the Kernel is a layer of native C/C++ modules 802 that perform the lower level tasks of file I/O to obtain the information used by the Monitors as well as socket I/O tasks to add, remove or update routing table entries.

The prototype system modifies the implementation of ANDROID's ifc_util.c, route.c, and netstat.c to add these non-existing modules to the system's module swi_utils.c. These modules are wrapped by JNI and are called from the Internal Classes layer. The Switching Service, the Monitoring Service and the Selection Policy are implemented as system services at the Internal Classes layer. These services are created during the device start-up and they run as long as the device is running The ANDROID SystemServer, or similar component in other device systems, may be modified to start these services when the device starts.

An API is provided to configure and control the Switching Engine. In the prototype, this API was used to extend ANDROID's built in wireless control settings application so that the Switching Engine can be stopped, restarted and configured to run in different modes from the application layer. When the engine is stopped, this API can also be used by the application programmers to switch interfaces, send a specific flow using a specific interface, or to use multiple interfaces simultaneously.

Two of the methods in the API are useful from the application programmers' point of view. The first one is the switch-ToInterface ( ) method 511, which allows the programmer to switch interface when needed. This is useful for applications that need to send proprietary data over the cellular network while preferring for all other purposes to be on WiFi. Another method is a useInterface ( ) method to send or receive data using a specific interface for a specific connection. Note that, this method does not switch the interface; rather if the preferred network is available, it sends the data using that interface for the specified connection only. With this method, an application can use multiple interfaces simultaneously. Both of these methods are requests to the switching system. The requests may fail if the application does not have proper permissions or the Switching Engine is currently running.

Typically, mobile phone operating systems do not allow simultaneous usage of multiple wireless networks, i.e., only one network interface is activated at any time. The OS assigns priorities to all networks that are supported and tries to connect to the most preferred network upon availability. Once it succeeds to connect to a high priority network, it tears down the other network. Applications therefore typically cannot simultaneously use multiple networks.

Some operating systems that support WiFi tethering allow tethering applications to use both WiFi and cellular networks. In this case, the phone creates a local wireless LAN with its WiFi interface and connects to the Internet with the cellular interface. In contrast, our system enables applications to access to the Internet via multiple network interfaces and allow the developers to choose one or more of them—selectively or simultaneously.

The system described herein overcomes the traditional exclusiveness of wireless interface usage, providing independent control over both of these interfaces to the applications. An application can take advantage of this control by selecting the best network to serve its purpose. Applications (with proper permission) can communicate to any port of any remote server using any available wireless interface. In order to allow an application to choose any available wireless interfaces for a specific communication, it has to be able to tell the system which interface it wants to use for which remote device. Once the system gets this information, it checks to see if the interface is available for connectivity and if so it adds a route into the system routing table for the specific remote IP. Any subsequent connections (TCP or UDP sockets) are bound to the chosen wireless interface.

FIG. 9 provides a pseudocode example 900 of concurrently using a 3G and a WiFi network. In this example, the application transfers sensitive data, such as user credentials, over a secured 3G network (see commented line 901), while transfers less sensitive data over a public WiFi networks (see commented line 902).

In evaluating the prototype system, experiments were performed on multiple ANDROID Developer Phones 2 (ADP2). The mobile devices ran the described system on top of ANDROID OS (ECLAIR 2.1-update 1). The devices used were 3G-enabled T-MOBILE phones using 3G, EDGE, GPRS and WiFi 802.11b/g connectivity and were equipped with an ARM processor, 512 MB flash memory, 192 MB RAM, 1 GB microSD card, and 528 MHz processing power.

The evaluation employed benchmarks, data traces from real users, and real usage of the system to provide workloads. The benchmarks used were ones that are available in the market to exercise different aspects of the system. Although these benchmarks are useful to evaluate the overhead of the system, none were useful for evaluating the performance of the connectivity of the phone. Thus the inventors developed software to log information related to the running applications within the phone periodically and send the information to a remote server.

Thirteen volunteers in the age range of 25 to 35 years were equipped with these phones with the data logger as described above, and they carried around the phones to wherever they wished and used the phones for both voice and data connectivity as needed for 90 days. The information that collected from these logs includes the names and types of applications run, the frequency and the duration of their usage, and the data usage information for each wireless interface for each user. For each of these applications, the logger provided the total number of bytes and packets transmitted and received over cellular and WiFi, as well as information regarding all the TCP and UDP sessions.

The inventors utilized an implementation of LINUX's NETSTAT tool for ANDROID to obtain the information about these sessions. Using the data collected about the applications and the logs of all the TCP and UDP sessions of these applications, i.e. IP address, port, starting time offset and the duration, the inventors reproduced these flows using a traffic generator. The traffic generator is set to replay the same flows recorded in the log, albeit using different server IPs.

The switching engine starts a number of system services at the device startup that are always running in the background. Running such system services may add undesirable overhead to the system in certain circumstances. For example, the core switching service that runs a thread is costly if the sleeping interval of the thread is too small. One goal of the experiment was to determine a minimal sleeping interval for which the overhead is reasonable. In order to measure this overhead, the inventors ran a set of benchmarks on the device, with and without the switching engine and compared the two scores. None of these benchmarks use any data connectivity and hence no interface switching happens during this experiment. The overhead is due to the engine's continuously monitoring and checking for an opportunity to switch only. We used seven sets of benchmarks that are available in ANDROID MARKET and have been downloaded 10,000 to 50,000 times as reported in the website. Table 1 below gives a brief description of the benchmarks.

TABLE 1

Description of benchmarks

| Benchmark | Description |
| --- | --- |
| Linpack | Solves dense N × N system of linear equations. |
| Fps2d | Measures 2D graphics frames per second. |
| CMark | CaffeineMark embedded benchmark. Measures performance of Java programs involving prime generation, loop, logic, method, floats. |
| Graphics | Draws opacity and transparent bitmaps. |
| Cpu | CPU performance of MWIPS, MFLOPS, and VAX MIPS (SP and DP). |
| Mem | Memory copy operation. |
| File | File create, write, read, and delete. |

Figure 10:
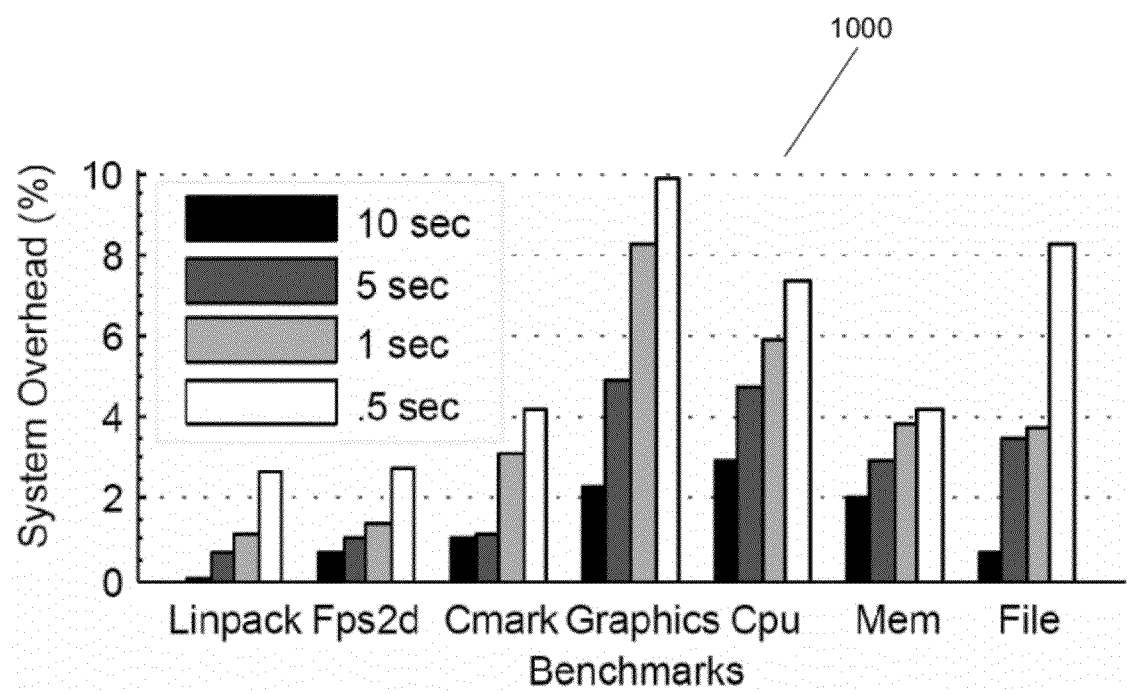
FIG. 10 is a bar chart showing the relative benchmark scores of the device for running the switching engine at 10 sec, 5 sec, 1 sec, 0.5 sec sleeping intervals with respect to benchmark scores on original Android OS that does not have our switching system.

The bar chart 1000 of FIG. 10 illustrates the relative benchmark scores of the device for running the switching engine at 10 sec, 5 sec, 1 sec, and 0.5 sec sleeping intervals with respect to benchmark scores on original ANDROID that does not have the described switching system. As can be seen, the greater the sleeping interval, the smaller the overhead and the closer the score is to that without running the engine. However, if this interval is large, the responsiveness of the engine becomes unresponsive. It was therefore determined to run the engine in 5 sec intervals to keeps the overhead minimal while at the same time providing sufficient responsiveness. The amount of source code added or changed relative to the original source code of ANDROID is shown in Table 2.

TABLE 2

Lines of code

| Lines of code | Added | Modified |
| --- | --- | --- |
| C/C++ | 209 | 0 |
| Java | 642 | 8 |

Figure 11:
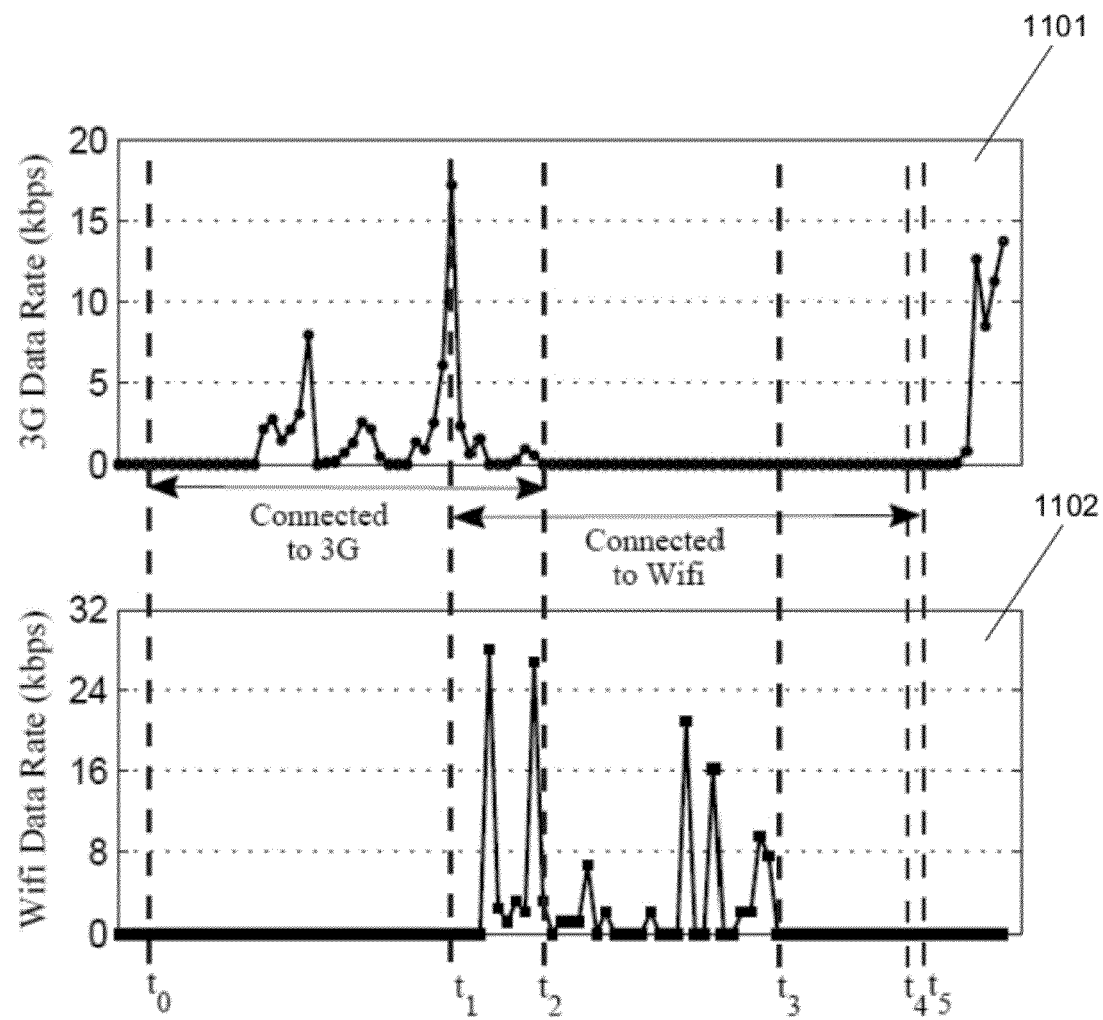
FIG. 11 is a data plot showing an example of switching from one wireless interface to another network interface.

The switching time is the delay between the time that the engine makes a determination to switch and the time that the device is completely connected to the new interface and disconnected the old interface. A number of factors determine this delay: the time taken by the new interface to turn On, the time taken by the existing TCP connections in the old interface to finish, the timeout parameter for ongoing TCP flows on the old interface, and the time taken by the old interface to go Off. The data plots 1101 and 1102 of FIG. 11 illustrate an example of switching. In the illustrated scenario, data is initially sent over the 3G network, and is switched to WiFi when the data rate over 3G exceeds 16 KBps. The system switches back to 3G when the WiFi is idle for 30 sec. The timeout for all ongoing TCPs over the old interface is set to 20 sec. The parameters chosen for this experiment are for demonstration purposes and are not intended to optimize any factor. Plot 1101 shows the data rate over 3G while plot 1102 shows the same for WiFi.

At time $t_0$, the device begins using 3G for browsing various web pages. The monitoring engine keeps track of the data rate and at time $t_1$, detects that the threshold of 16 KBps is exceeded. The switching engine then makes a determination to switch to WiFi. The system turns On the WiFi connectivity and guides all new flows to start over WiFi while keeping old flows active over 3G. This continues until time $t_2$, when the timeout occurs and all existing TCPs over 3G is closed. The duration of $[t_1, t_2]$ represents the switching time when both interfaces have one or more TCP flows.

After time $t_2$, the device is connected to WiFi only and continues at this state until it discovers at time $t_4$ that it has been idle since $t_3 = t_4 - 30s$. At time $t_4$, the engine again initiates a switching from WiFi to 3G. Since at this point there is no ongoing TCP session over WiFi, the switching to 3G happens almost immediately at $t_5$. As can be seen, the timeout (20 sec) is the principal component determining the switching time.

Although the timeout could conceivably be set so long as to allow all TCP flows in the old interface to finish in every situation, the system will be sending and receiving data over both interfaces simultaneously, draining the battery excessively. Thus, a balance between the switching time and the number of interrupted TCP flows is desirable.

TABLE 3

Minimum time to switch interfaces

| Type | Switching time (msec) |
| --- | --- |
| 3G to WiFi | 1212 |
| WiFi to 3G | 196 |

Figure 12:
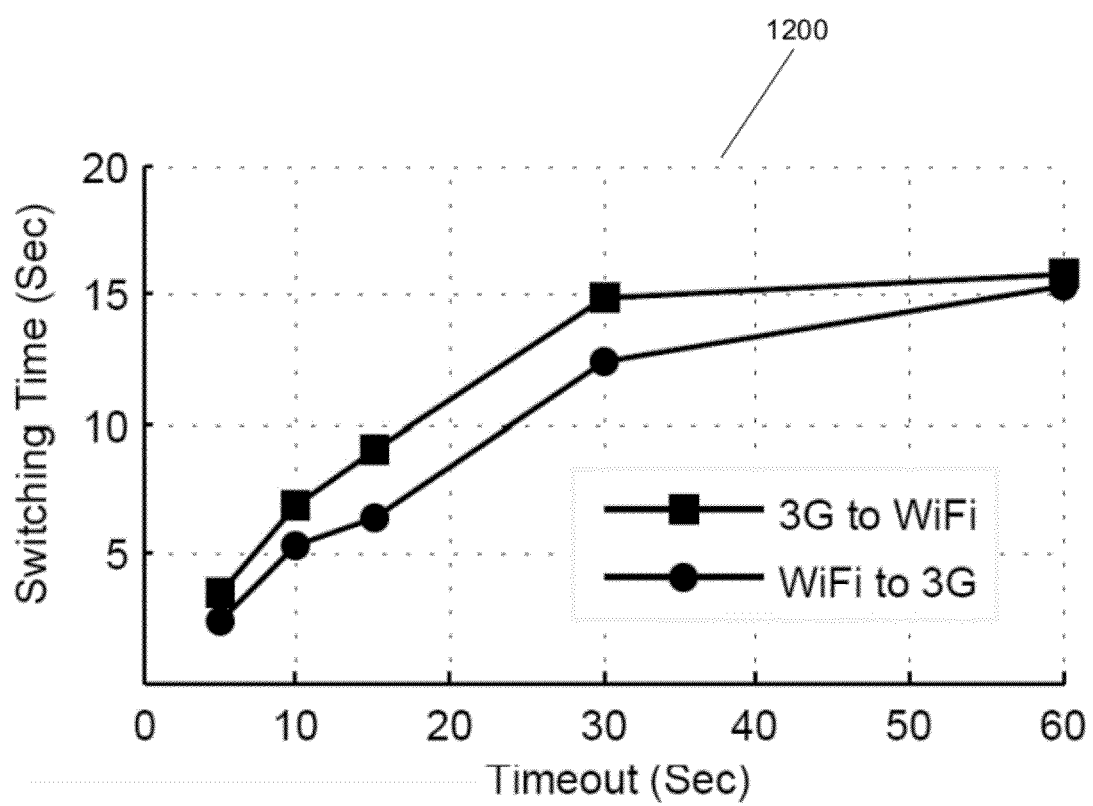
FIG. 12 is a data plot showing the switching time in presence of data activity for different timeout values.

Table 3 above shows the switching time overhead. In this case, we do not send or receive any data over any interface. Switching to WiFi takes about 1 sec more than switching to 3G. This is because connecting to WiFi requires a number of steps involving scanning for access points, associating with one of them, handshaking and providing a dhcp request, which are not required for 3G. The data plot 1200 of FIG. 12 shows the switching time in the presence of data activity for different timeout values.

As can be seen, the switching times are closer to the corresponding timeouts for values<5 sec. Since most of the sessions are short lived and they finish in 10-15 sec, the response to the timeout value is stronger for lower timeout values. There are still some sessions that remain until the end of the timeout even for values>30 sec, but they are small in number.

Figure 13:
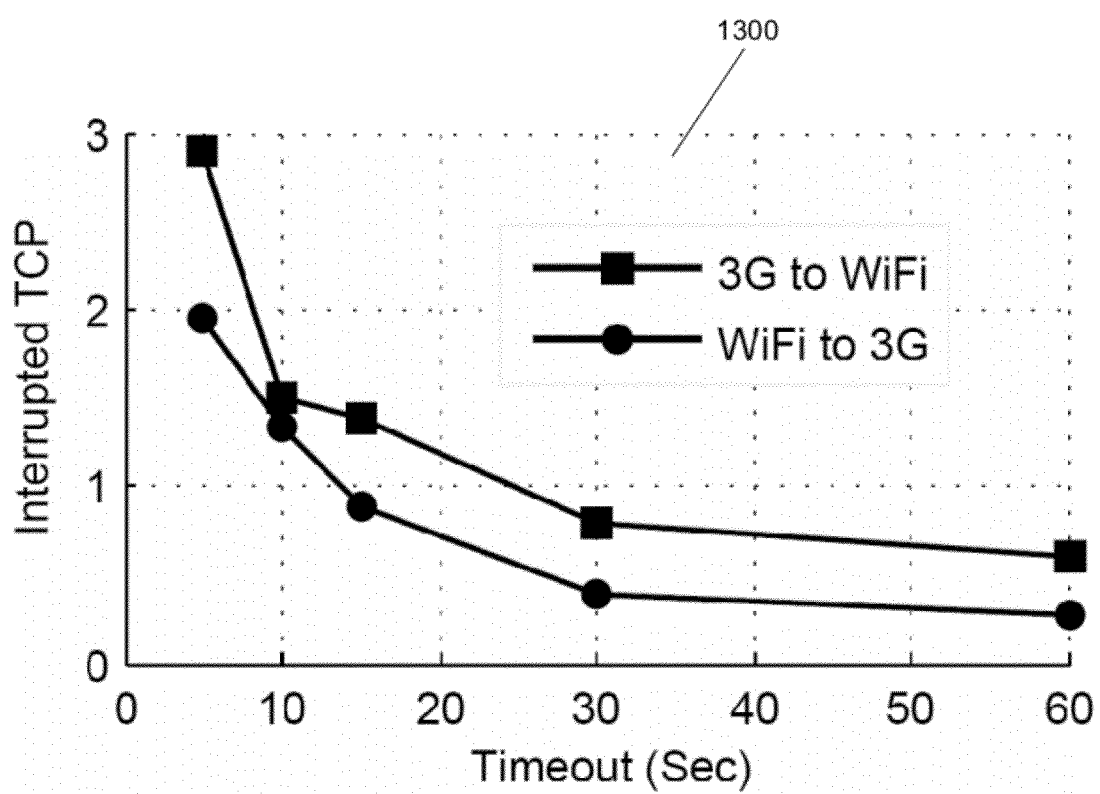
FIG. 13 is a data plot showing the TCP interruption due to switching wireless interfaces.

This can be seen in the data plot 1300 of FIG. 13. Plot 1300 shows the number of TCP sessions that get disconnected for varying timeout values. As can be seen, this number becomes less than 1 after 15 sec and continues to get lower with increasing timeout values. As noted above, these long sessions are typically used to communicate with the applications' servers and any interruptions of these automatically initiate new connections with the server, and hence there are no visual interruptions for this at all. Therefore, by setting the timeout to 30 sec, the system can minimize the number TCP disconnections while maintaining an average switching time of 15 sec.

Figure 14:
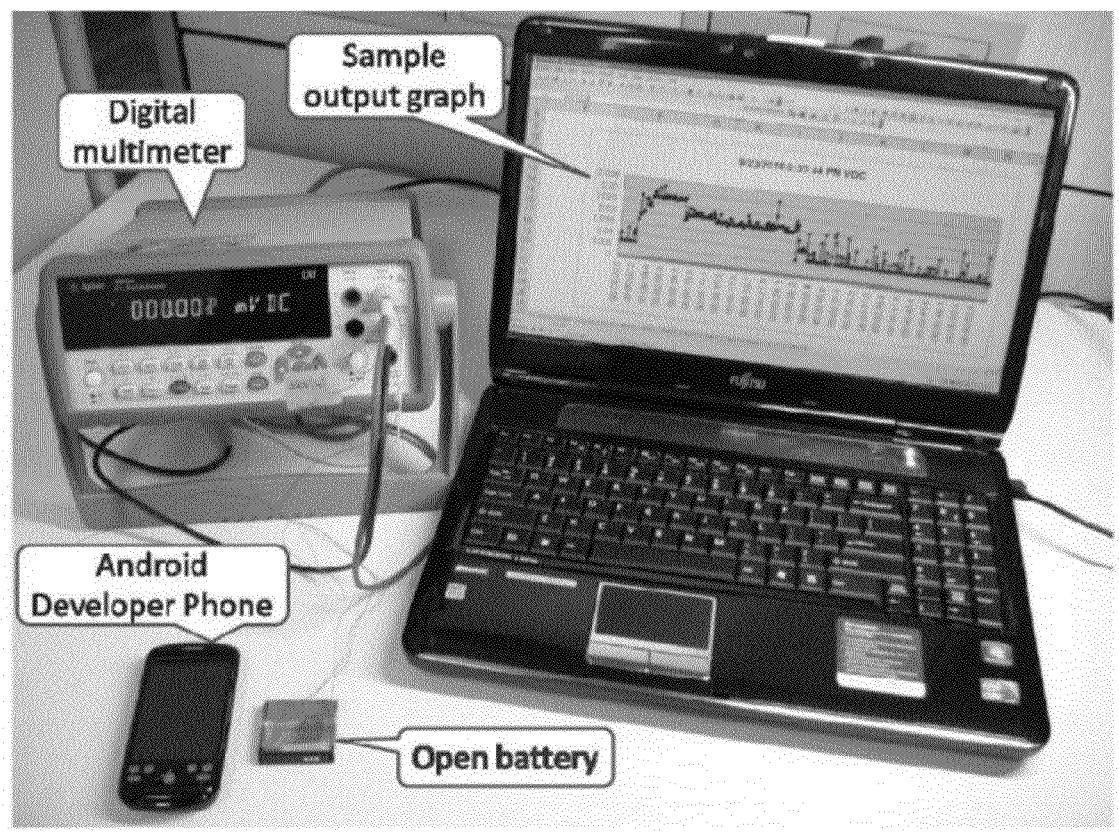
FIG. 14 is a system hardware schematic showing the digital power multimeter and an open battery used for energy measurements, and a sample output graph.

Modern mobile phones do not provide a mechanism to obtain fine-grained energy usage, but instead provide a high level simple API for observing remaining battery life. To perform precise fine-grained energy measurements on ANDROID mobile device, the inventors conducted experiments using a high-precision digital power multimeter. The AGILENT 34410A Digital Multimeter 1401 shown in FIG. 14 provides fine-grained measurements once every millisecond.

For measurements, the battery remained within the mobile device and the power transferred from the battery to the phone was measured. The charger was disconnected in order to eliminate interference from the battery charging circuitry. To measure the energy consumption, the battery case was opened and a 0.1Ω resistor was placed in series with the battery (FIG. 14). The voltage drop across the resistor was measured to determine the battery current, and this was used together with the input voltage to the phone to calculate the mobile device energy consumption.

Figure 15:
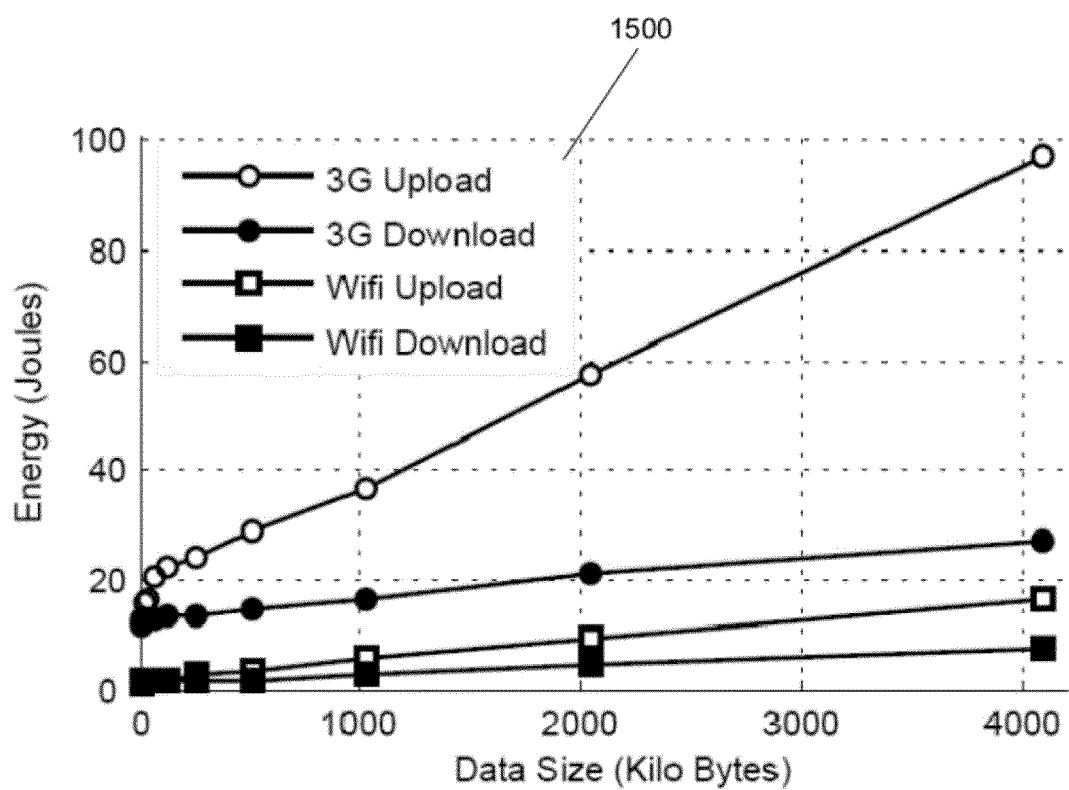
FIG. 15 is a data plot showing the energy consumption for both downloading and uploading data sizes over 3G and WiFi networks.

Energy measurements were performed for data transfers of varying data sizes over 3G and WiFi networks. The data plot 1500 of FIG. 15 shows the average energy consumption measured both for downloading and uploading 4 KB to 4 MB over 3G and WiFi networks respectively. The energy needed for sending and receiving different data sizes to and from a remote server using HTTP requests was measured. The experiments were performed using a remote server running Linux 2.6.28 with a static IP address.

Once a download or upload had been completed, the smartphone sent the next HTTP request to the remote server. The experiment was repeated ten times for each data size and the results were averaged. The standard deviation for all measurements was less than 5%. The smartphone screen brightness was set to minimum for all samples.

The average idle power consumed by the 3G and WiFi network interfaces was found to be 295.85 mW for WiFi and 3.11 mW for 3G. In addition, the average energy costs of turning on WiFi and 3G interfaces were 7.19 and 13.13 Joules, respectively, and these numbers were subtracted from the measurements. As expected, the energy needed to upload data was higher than that for download (see FIG. 15). Furthermore, the results show that the average energy consumption for data transfers of large data sizes over WiFi was less than that over 3G.

The energy used when downloading or uploading varying data sizes across 3G and WiFi networks without any other activity on the smartphone was estimated as follows. For any data transferred over the cellular and WiFi networks, an energy overhead cost of about 12 Joules was incurred for 3G, and roughly 1 Joule for WiFi (see FIG. 15). This means that every data transfer request incurs the same energy overhead within each system. After the connection is established, the energy used to both upload and download increases with the amount of data being uploaded or downloaded. The energy consumption for uploading or downloading a specific amount of bytes was estimated by using linear interpolation of the appropriate segment in FIG. 15, assuming the connection is already established.

In order to estimate how much data traffic can be offloaded from the 3G to the WiFi network within the prototype setup, the data traces were analyzed. For each user, the average daily WiFi usage was compared to the amount of data that it is possible to offload if the other system were to be used instead. The offloading strategy was to switch all 3G traffic to WiFi whenever a connectible access point was found. An access point was considered to be connectible if and only if it was available and had been used by the user frequently in the past.

Figure 16:
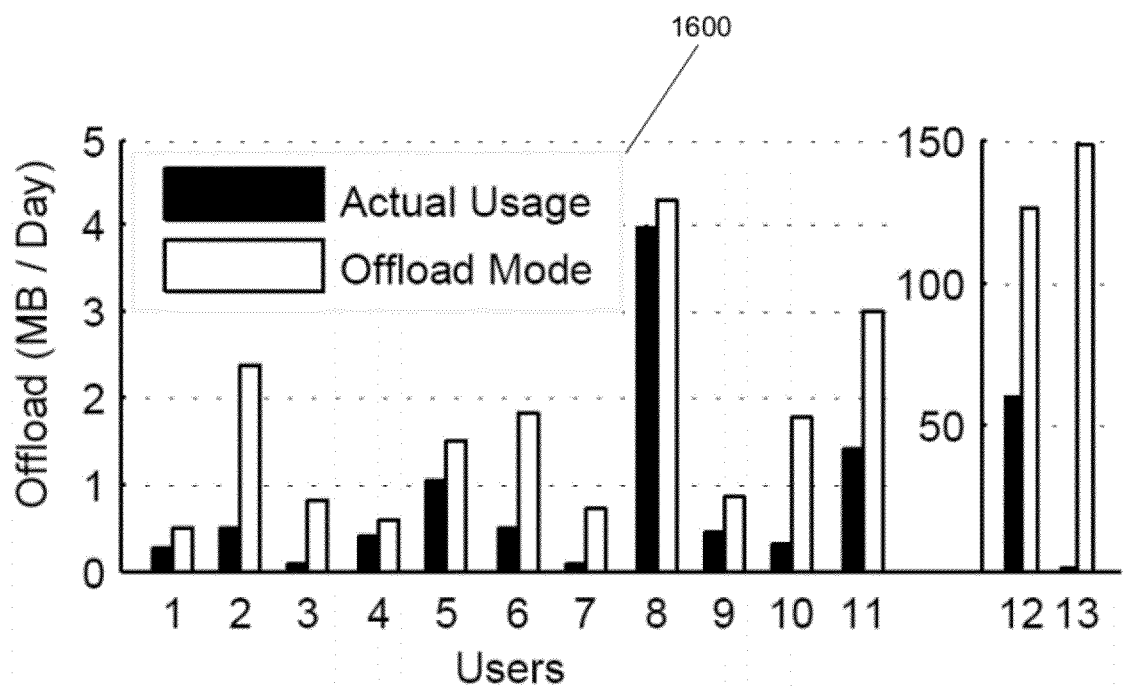
FIG. 16 is a data plot showing the offloading the data traffic from 3G to WiFi networks.

The data plot 1600 of FIG. 16 shows this comparison for each of the users. As can be seen, for some users (e.g. 3, 7) 11-14 times more data could be offloaded, and for users who do not tend to use available WiFi at all (e.g. 13) this difference was about 150 MB per day. Considering all users, with switching, the system as able to offload on average 22.45 MB of data per day per user which was 79.82% of the average daily usage (28.13 MB). This is a significant amount of offloading.

The average daily energy consumption for each user in the data traces was calculated using an energy model. All four cases of data transmission and reception over WiFi and 3G were considered separately, as was the idle power. The optimum energy consumption of each user was computed assuming they switched optimally. This computation artificially assumes knowledge of the future data usage. The system used a simple heuristic that switched interfaces based on predefined thresholds as discussed above.

Since data communication in WiFi are less expensive, for switching from 3G to WiFi, a data threshold of 1 KB was used. If the phone activity crossed this limit, the system switched to WiFi. On the other hand, since idle power of WiFi is much higher than 3G, the system switched the phone back to 3G when data activity was absent over WiFi for 60 seconds.

Figure 17:
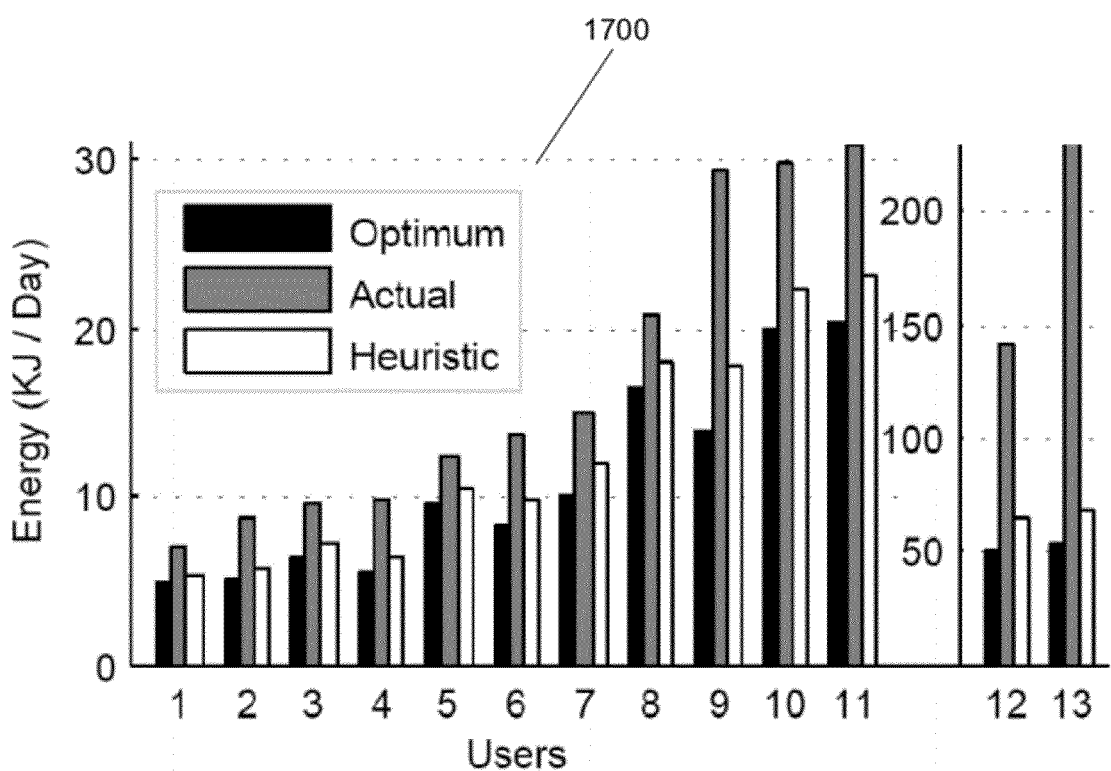
FIG. 17 is a data plot showing the average daily energy consumptions of all the users for three strategies: optimum, actual and the heuristic that we use in the system.

The day plot 1700 of FIG. 17 shows the average daily energy consumptions of all the users for three strategies: optimum, actual and the heuristic employed in the system. As can be seen, switching optimally saves on average 24.17 KJ energy per user per day, which is as high as 89-179 KJ for some users (e.g. 12, 13). In addition, however, it can be seen that the simple heuristic is surprisingly close to the optimum solution with an average deviation of only 13.8%, and was able to cut down the daily energy usage by 27.4% (21.14 KJ) on average.

With respect to performance, the performance of web applications is significantly boosted by switching to the interface with the higher bandwidth. The illustrated data trace recorded the signal strengths of both the cellular and all available WiFi networks at 30 sec intervals. These signal strengths were mapped to bandwidths after performing measurements using iperf tool. In particular, IPERF server was run at the experiment's server computer, and iperf client was run on the ANDROID phones. The communications between the two was over the Internet.

Figure 18:
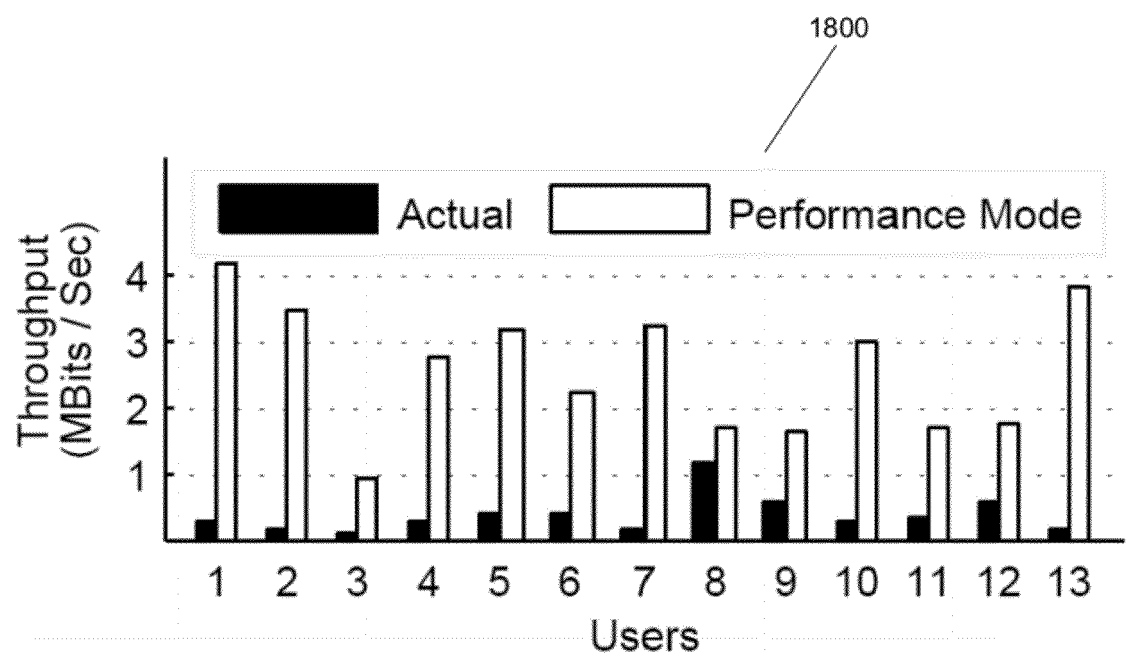
FIG. 18 is a data plot showing the average daily throughput of each user for actual usage.

Measurements in both indoor and outdoor environments were taken, and the average of 10 measurements at varying signal strengths are reported in Table 4. With these measurements, the average daily throughput of each user was calculated for his actual usage, and also while considering switching. This comparison is shown in the bar chart of FIG. 18. It can be seen that with switching enabled, it is possible to achieve an average throughput of 2.58 MBits/sec, which was 7 times more than the actual usages. For some users (e.g., 1, 2, 4, 13) this gain was about 14-24 times. These are the users who tend to remain in the 3G network even if WiFi is available for them to connect to. With this switching policy, even if the decisions to switch are made based on signal strengths, given that current 3G networks are always slower than WiFi, the policy selects WiFi approximately as if it were in Offload mode. However, assuming future improvement of cellular data network technology, this gap will diminish. Measurements with recent High Speed Packet Access Network (HSPA+) in Table 4 show that this network is about 10 times faster than 3G. In near future, cellular networks may have a comparable bandwidth to WiFi, and the performance mode of the described system will have an even greater impact.

TABLE 4

Bandwidth of WiFi, HSPA+, and 3G at different signal levels are measured using iperf tool.

| WiFi | | HSPA+ | | 3G | |
| --- | --- | --- | --- | --- | --- |
| Signal (dBm) | BW (Mbps) | Signal (dBm) | BW (Kbps) | Signal (dBm) | BW (Kbps) |
| ≤−50 | 8.58 | −65 | 929 | −63 | 138 |
| (−50; −60] | 7.06 | −73 | 858 | −89 | 115 |
| (−60; −70] | 6.16 | −89 | 746 | −101 | 104 |
| (−70; −80] | 3.99 | −97 | 509 | | |
| >−80 | 1.25 | | | | |

With respect to video streaming, in contrast to generic applications, these services consume high network bandwidth and have stringent delay constraints, and thus can benefit from concurrently using multiple interfaces. The described system also supports such real time applications.

The inventors implemented a streaming server on LINUX, which transmits video data using UDP packets to mobile clients. The streaming server supports multi-path video streaming for each client, and employs a known "leaky bucket" technique for every path to control the transmission rate. An ANDROID client was implemented using the system API described above, to receive video packets from 3G, WiFi, or both interfaces. The client continuously requests video packets from the server, and periodically reports the average packet loss ratio of each interface to the server. The server adjusts the transmission rates to ensure that the packet loss ratio is below 5% and can be concealed by standard video coding tools. The mean packet loss ratio across all experiments was 4.48%.

To accurately emulate a commercial service, the streaming server was connected to the Internet via a 10 Mbps dedicated link, and the mobile phone had two access networks: a 3G cellular network and a WiFi network with residential DSL service. Six video traces were randomly chosen from a video trace library. The video traces were extracted from MPEG-4 and H.264/AVC coded streams with diverse video characteristics. The server was configured to stream each video for two minutes, and the mobile client was instructed to log packet arrival times.

The experiments were repeated with 3G, WiFi, and both interfaces. Two performance metrics were considered, namely streaming rate and preroll delay. Streaming rate refers to the achieved transmission rate, and preroll delay is the time for the client to fill its receiving buffer in order to guarantee smooth playout.

Figure 19:
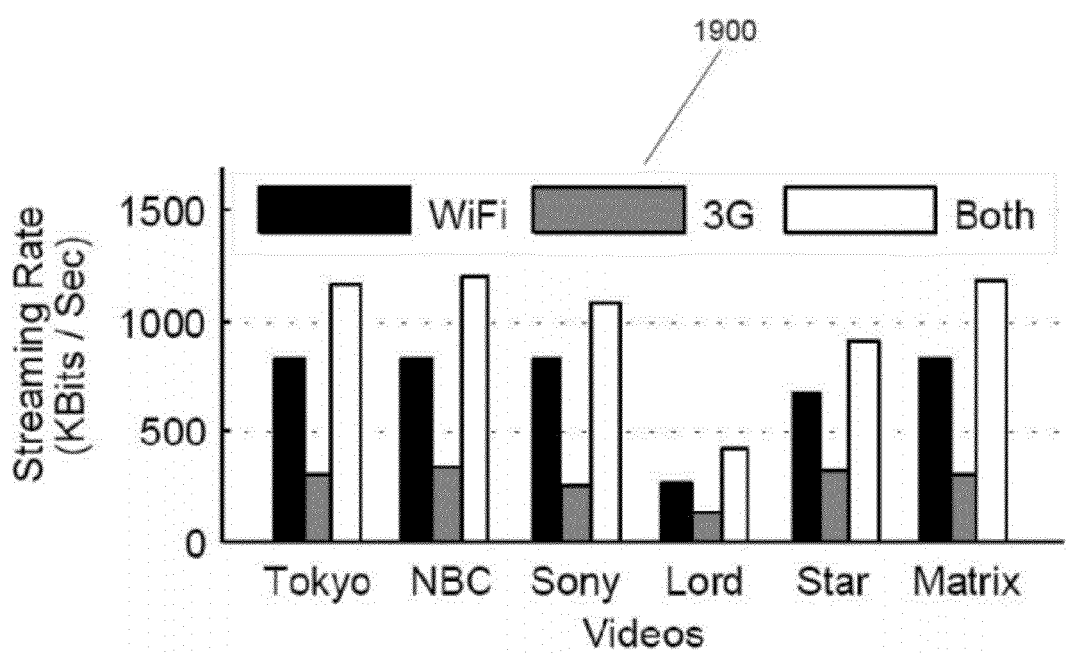
FIG. 19 is a data plot showing the streaming rate with both 3G and WiFi network interfaces.

The streaming rates are shown in the data plot of FIG. 19, which shows that the streaming service successfully achieved higher streaming rates by using both interfaces. More precisely, compared to WiFi and 3G, streaming over both interfaces increased the streaming rate by 43% and 271%, respectively. Table 5 presents the preroll delays of three high-resolution videos; other videos have much lower encoding rates and require negligible preroll delays. This table illustrates that streaming over both interfaces significantly reduces the preroll delay, e.g., the preroll delay of Matrix was reduced from 195.5 sec (or 20 sec) to merely 0.16 sec by using both interfaces. Higher streaming rates and lower preroll delays lead to better user experience, which is made possible by the described system.

TABLE 5

Streaming with both interfaces achieves lower preroll delay

| Preroll Delay | MATRIX (sec) | STARWARS (sec) | OLYMPICS (sec) |
|---|---|---|---|
| 3G | 195.50 | 77.42 | 477 |
| WiFi | 20 | 1.36 | 117 |
| Both | 0.16 | 0.15 | 51 |

To quantify the performance of the system in a real-world scenario, further experiments were conducted at the Stanford University campus, since it has WiFi connectivity both inside and outside the buildings and also has several areas where WiFi is either completely unavailable or has a very poor signal strength. Four HTC phones of the same model were carried on campus during the experiment. Two of these phones have the described system installed and the other two ran ANDROID (Eclair 2.1). To make the comparison fair, a traffic generator was used to replay the same data traffic in all phones. The traffic generator application ran in the phone and sent and received data over the Internet to and from a server situated in a lab 4 miles distant from Stanford.

The phones replayed the traffic patterns of the most popular 6 applications from the data traces having sessions of varying numbers, durations, delays and data traffic. Once started, the phones ran each application for 10 minutes followed by a 10 minutes break, repeatedly one after the other. The transmitted and received bytes, signal strengths, MAC addresses of WiFi APs, battery current, and voltage and capacity into the file system of the phone were logged every 2 seconds for later analyses.

Figure 21:
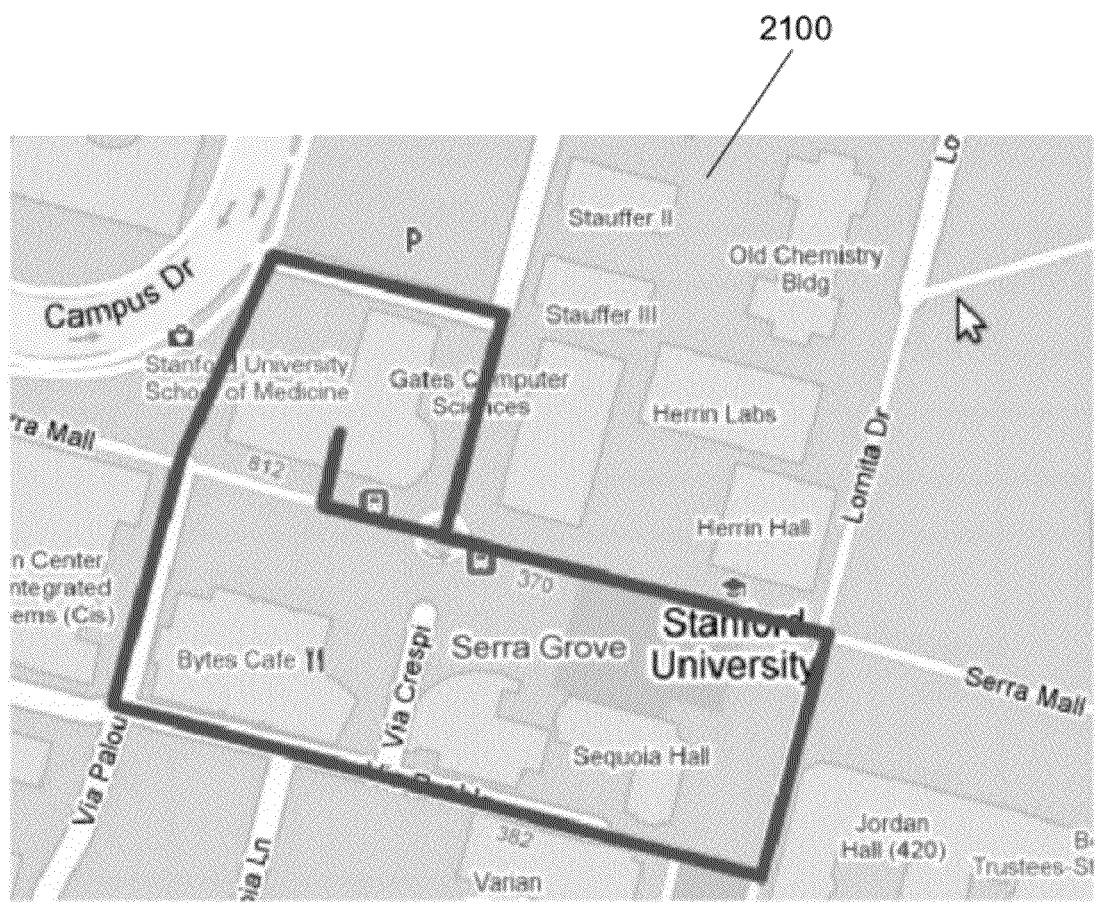
FIG. 21 is a schematic map showing the round trip tour within a University campus.

In this experiment, one of the phones was configured in the energy saving mode. Another two phones running ANDROID—one with WiFi enabled, and the other staying over 3G only—were taken initially. The traffic generator was started in all 3 phones and a 168 minutes campus tour was taken starting from the Computer Science building. The participants moved around all 5 floors of the building for an hour, then took an hour long round trip tour within the campus as shown in the map 2100 of FIG. 21, and finally returned to the building to spend the rest of the tour.

Figure 20:
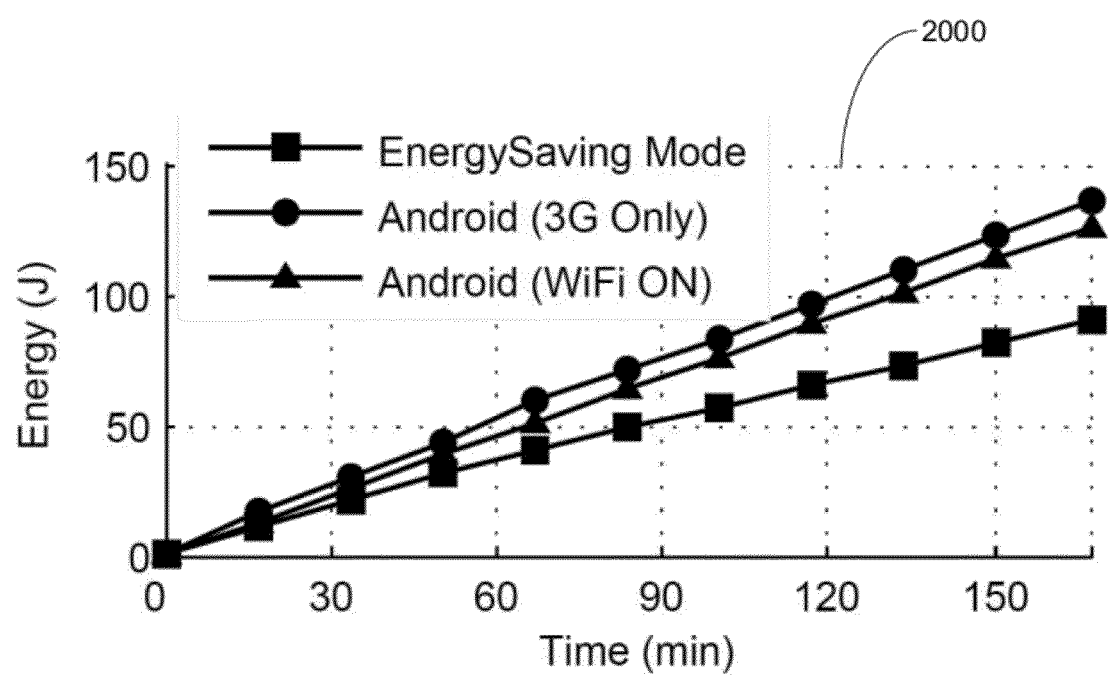
FIG. 20 is a data plot showing the energy consumption of each of three phones, one with system support in energy saving mode, and two other phones that run Android—one with WiFi enabled, and the other one with 3G.

During the tour, the phones experienced 37 different WiFi APs, average signal strength of −68.46 dBm inside the building and −82.34 dBm outside the building, 28 disconnections from WiFi to 3G, and a total of 49 witchings by the described system. Using the instantaneous values of current and voltage obtained from the log, the energy consumption of each of these phones was computed and the cumulative energy consumption is shown in data plot 2000 of FIG. 20. The curve appears linear due to the limited resolution of the ANDROID system. Although the battery voltages and currents read from the ANDROID system are thus not entirely precise, it can still be seen that there is a clear difference in energy consumption among these 3 phones. For the same data traffic, the described system achieved about 28.4%-33.75% energy savings as compared to state of the art ANDROID systems.

In a further experiment, the inventors compared the offloading and throughput of the system with that of the state-of-the-art ANDROID. In MultiNets, we set the switching timeout to be 30 sec. Recall that cellular network being much slower than WiFi, the outcomes of Offload and Performance modes are similar, although their decision mechanisms are completely different. Therefore, these are presented together in Table 6 below. This table also gives the achievable lower and upper bounds of Android on offloading and throughput. The lower bound is derived by disabling WiFi interface (3G Only), and the upper bound is achieved by always switching to WiFi whenever it is available (WiFi On). This table shows that: MultiNets (i) leads to three times higher throughput than the Android lower bound, (ii) achieves near-optimal offloading and throughput, and (iii) experiences zero TCP disconnections throughout the experiments, while Android upper bound results in eight TCP disconnections.

TABLE 6

For near-optimal offloading and throughput, MultiNets experiences no TCP disconnections through the experiments.

| System | Offload (MB) | Throughput (kbps) | Disconnections (Count) |
|---|---|---|---|
| MultiNets | 45.41 | 116.20 | 0 |
| Android (3G Only) | 0 | 39.29 | 0 |
| Android (WiFi On) | 44.54 | 116.26 | 8 |

The trade-offs between the energy savings vs. offloading can be seen. The described system in energy-saving mode consumes about 55.85% less energy than other two modes, but sacrifices about 14.25% of offloading capability. The reason for this is that the energy-saving mode keeps the phone in 3G while it is idle. When data transmission starts, it keeps the phone in 3G mode for a time before completely switching to WiFi, and hence the overall WiFi offloading and throughput is slightly less in this case.

TABLE 7

Energy saving mode saves 55.85% energy while sacrificing about 14.25% offload capability

| Mode | Energy (J) | Offload (%) |
|---|---|---|
| Offload | 204.65 | 45.41 |
| Energy Saving | 90.36 | 38.94 |

Before ending this description, a brief overview of the optimum energy consumption technique described above will be given. Given the data usage $D_i$ of a user for every T seconds intervals, energy measurements for turning on ($E_{ON}^W$, $E_{ON}^C$), data activity ($E_D^W(D_i)$, $E_D^C(D_i)$), and idle power ($P^W, P^C$) of the WiFi and cellular interfaces, and the availability of WiFi, the goal is to find the optimum energy consumption considering switching. The problem is a multi-stage graph optimization problem where the time points are the stages and the interfaces are the choices (sometimes only one choice—3G) at each stage. We define f(i,C) as the optimum energy from the starting time (time=1) until i-th time, such that we use 3G at time i. The definition of f(i,W) for WiFi is similar. The following recurrence relations hold:

$$f(i, C) = \min \begin{cases} f(i-1, C) + P^C \times T + E_D^C(D_i) \\ f(i-1, W) + E_{ON}^C + P^C \times T + E_D^C(D_i) \end{cases}$$

$$f(i, W) = \min \begin{cases} f(i-1, W) + P^W \times T + E_D^W(D_i) \\ f(i-1, C) + E_{ON}^W + P^W \times T + E_D^W(D_i) \end{cases}$$

With initial conditions $(0,C)=E_{ON}^C$, $f(0,W)=E_{ON}^W$. These recurrences are written assuming WiFi is available. To address the cases when WiFi is not available, ignore f(i−1,W) in f(i,C), and set f(i,W)=f(i,C). Finally, the optimum energy can be computed as the minimum of f(n,W) and f(n,C) where n is the total number of time points.

All references, including publications, patent applications, and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A mobile client device for communicating with a remote server device and dynamically switching among multiple wireless interfaces of the mobile client device, the mobile client comprising:
    a first interface for communicating over a cellular network;
    a second interface for communicating over a WiFi network; and
    a computer-readable medium, having thereon computer-executable instructions for switching one or more connection-oriented sessions from one of the first and second interfaces to the other of the first and second interfaces based on a selection policy selected from an energy saving selection policy, an offload selection policy, and a performance selection policy;
    wherein the computer-executable instructions for switching comprise instructions for:
        counting existing Transmission Control Protocol (TCP) connections on a current interface of the first and second interfaces;
        adding new routing table entries for the counted connections specifying the destination address, gateway and mask for the current interface if the count is non zero so that existing TCP flows remain in the current interface;
        activating the other of the first and second interfaces;
        adding routing table entries for the other interface including a default route;
        removing a default route of the routing table of the current interface;
        awaiting expiration of a predefined timeout period; and
        deactivating the current interface so that the mobile client device uses the other interface.

2. The mobile client device according to claim 1, wherein the energy saving selection policy specifies that the mobile client device use the first interface while idle and use the second interface when an application running on the mobile client device is sending and receiving mobile data and a predetermined threshold condition is met.

3. The mobile client device according to claim 2, wherein the predetermined threshold condition specifies availability of WiFi and that a total amount of data sent over the first interface by the application exceeds a predetermined data threshold.

4. The mobile client device according to claim 2, wherein the energy saving selection policy further specifies that after using the second interface, the mobile client device return to using only the first interface when data activity over the second interface falls below a utilization threshold for a predetermined period of time.

5. The mobile client device according to claim 1, wherein the offload selection policy specifies that the mobile client device use the second interface when the mobile client device is sending or receiving data and WiFi connectivity is available.

6. The mobile client device according to claim 5, wherein the offload selection policy further specifies that after using the second interface, the mobile client device will again use only the first interface when WiFi connectivity becomes unavailable.

7. The mobile client device according to claim 5, wherein the offload selection policy further specifies that after using the second interface, the mobile client device will again use the first interface when a WiFi signal strength falls below a predetermined WiFi threshold.

8. The mobile client device according to claim 1, wherein the performance selection policy is adapted to maximize available data throughput without regard to energy usage.

9. The mobile client device according to claim 8, wherein maximizing available data throughput comprises reading a cellular signal strength and a WiFi signal strength, inferring an achievable bandwidth based on the measured signal strengths, determining which of the first and second interface is associated with the higher bandwidth, and using the interface associated with the higher bandwidth.

10. The mobile client device according to claim 1, wherein sessions that have one past the established state are disregarded while counting existing TCP connections on the current interface.

11. A method for allowing a mobile client device to dynamically switch among multiple wireless interfaces to respective multiple wireless networks, the method comprising:
   using a first one of the multiple wireless interfaces to execute one or more connection oriented sessions;
   accessing a selection policy;
   determining while using the first one of the multiple wireless interfaces that the selection policy specifies switching to a second one of the multiple wireless interfaces; and
   switching the one or more connection-oriented sessions from the first wireless interface to the second wireless interface;
   wherein the switching comprises:
      counting existing Transmission Control Protocol (TCP) connections on the first wireless interface;
      adding new routing table entries for the counted connections specifying the destination address, gateway and mask for the first wireless interface if the count is non zero so that existing TCP flows remain in the first wireless interface;
      activating the second wireless interface;
      adding routing table entries for the second wireless interface including a default route;
      removing a default route of the routing table of the first wireless interface;
      awaiting expiration of a predefined timeout period; and
      deactivating the first wireless interface so that the device uses the second wireless interface.

12. The method according to claim 11, wherein the selection policy is selected from an energy saving selection policy, an offload selection policy, and a performance selection policy.

13. The method according to claim 12, wherein the energy saving selection policy specifies that the mobile client device use the first wireless interface while idle and use the second wireless interface when an application running on the mobile client device is sending and receiving mobile data and a predetermined threshold condition is met.

14. The method according to claim 13, wherein the predetermined threshold condition specifies availability of Wifi and that a total amount of data sent over the first wireless interface by the application exceeds a predetermined data threshold.

15. The method according to claim 12, wherein the energy saving selection policy further specifies that after using the second wireless interface, the mobile client device return to using the first wireless interface when data activity over the second wireless interface falls below a utilization threshold for a predetermined period of time.

16. The method according to claim 12, wherein the offload selection policy specifies that the mobile client device use the second interface whenever the mobile client device is sending or receiving data and WiFi connectivity is available.

17. The method according to claim 12, wherein the performance selection policy is adapted to maximize available data throughput without regard to energy usage by reading a cellular signal strength and a WiFi signal strength, inferring an achievable bandwidth based on the measured signal strengths, determining which of the first and second interface is associated with the higher bandwidth, and utilizing the interface associated with the higher bandwidth.

18. A method for switching wireless connection-oriented sessions in a mobile wireless device from a current one of a cellular interface and a WiFi interface to the other of the cellular interface and the WiFi interface, the method comprising:
   counting existing Transmission Control Protocol (TCP) connections on the current interface;
   adding new routing table entries for the counted connections specifying the destination address, gateway and mask for the current interface if the count is non zero so that existing TCP flows remain in the current interface;
   activating the other of the interfaces;
   adding routing table entries for the other interface including a default route;
   removing a default route of the routing table of the current interface;
   awaiting expiration of a predefined timeout period; and
   deactivating the current interface so that the device uses the other interface.

19. The method according to claim 18, wherein sessions that have gone past the established state are disregarded while counting existing TCP connections on the current interface.

* * * * *